(12) United States Patent
Kintz et al.

(10) Patent No.: US 9,690,014 B2
(45) Date of Patent: Jun. 27, 2017

(54) GRADIENT INDEX LENS AND METHOD FOR ITS FABRICATION

(71) Applicant: INVIS Corporation, San Jose, CA (US)

(72) Inventors: Gregory J. Kintz, Santa Cruz, CA (US); Philip J. Stephanou, Mountain View, CA (US); Kurt E. Petersen, Milpitas, CA (US); Srinivasan K. Ganapathi, Palo Alto, CA (US); John Batey, Incline Village, NV (US)

(73) Assignee: INVIS TECHNOLOGIES CORPORATION, Sunnyvale, CA (US)

( * ) Notice: Subject to any disclaimer, the term of this patent is extended or adjusted under 35 U.S.C. 154(b) by 0 days.

(21) Appl. No.: 14/965,875

(22) Filed: Dec. 10, 2015

(65) Prior Publication Data

US 2016/0216412 A1    Jul. 28, 2016

Related U.S. Application Data

(60) Provisional application No. 62/106,708, filed on Jan. 22, 2015.

(51) Int. Cl.
| | |
|---|---|
| G02B 3/00 | (2006.01) |
| G02B 13/14 | (2006.01) |
| G02B 13/18 | (2006.01) |
| G02B 5/18 | (2006.01) |
| H04N 5/33 | (2006.01) |
| H04N 5/378 | (2011.01) |
| G02B 27/42 | (2006.01) |

(52) U.S. Cl.
CPC ......... *G02B 3/0087* (2013.01); *G02B 5/1842* (2013.01); *G02B 5/1876* (2013.01); *G02B 5/1885* (2013.01); *G02B 13/14* (2013.01); *G02B 13/18* (2013.01); *G02B 27/4205* (2013.01); *G02B 27/4272* (2013.01); *H04N 5/33* (2013.01); *H04N 5/378* (2013.01)

(58) Field of Classification Search
CPC .................................................. G02B 3/0087
USPC .................................................. 359/652–655
See application file for complete search history.

(56) References Cited

U.S. PATENT DOCUMENTS

| | | | | |
|---|---|---|---|---|
| 4,844,589 A | * | 7/1989 | Asahara | G02B 3/005 |
| | | | | 359/652 |
| 2006/0139763 A1 | * | 6/2006 | Satzke | B82Y 20/00 |
| | | | | 359/652 |

(Continued)

*Primary Examiner* — Darryl J Collins
(74) *Attorney, Agent, or Firm* — Mark B. Floyd

(57) ABSTRACT

A gradient-index lens for focusing incident electromagnetic radiation comprises at least first and second substrates. Each of the substrates has a plurality of trenches or holes formed therein. The first substrate is stacked on the second substrate such that trenches or holes in the first substrate are substantially aligned with corresponding trenches or holes in the second substrate to form combined trenches or holes. Each of the combined trenches or holes has a width or diameter that is less than a wavelength of the electromagnetic radiation, and the spacing between adjacent ones of the combined trenches or holes is less than the wavelength of the electromagnetic radiation. The size and spacing of the combined trenches or holes in the stacked substrates are sufficient to produce an effective refractive index profile of the lens element that is graded. A method for producing the lens is also provided.

23 Claims, 31 Drawing Sheets

(56) References Cited

U.S. PATENT DOCUMENTS

2014/0043320 A1\* 2/2014 Tosaya ............... G02B 27/0172
 345/419
2015/0002927 A1\* 1/2015 Jeong ................... B29C 45/372
 359/356

\* cited by examiner

GRADIENT INDEX LENS AND METHOD FOR ITS FABRICATION

CROSS REFERENCE TO RELATED APPLICATIONS

This application claims the benefit of U.S. provisional patent application 62/106,708 filed on Jan. 22, 2015, which application is hereby incorporated by reference in its entirety.

BACKGROUND

The invention relates to optical devices, and in particular to gradient index lenses, and a method for fabricating a gradient index lens.

Certain existing thermal imaging solutions for night vision are based on uncooled micro-bolometer arrays that are sensitive to long wavelength infrared (LWIR) radiation in the wavelength range of about 8 to 15 µm. The infrared (IR) camera typically includes a camera core comprising a Focal Plane Array (FPA), a lens system and an enclosure. The FPA typically comprises multiple elements—the underlying Read-Out Integrated Circuit (ROIC), the thermistor or micro-bolometer pixel array which is built on top of the ROIC, usually on the same silicon wafer and integrated with the ROIC, and a "packaged window" or lid which is substantially transparent to incoming IR radiation from a source and bonded on top of the FPA with a hermetic vacuum seal. A single lens or a system of lenses is mounted on top of the FPA.

In certain conventional lenses, an effective index of refraction may be varied across the area of the lens to focus incident electromagnetic radiation. In an example, a convex lens may have a thickness that decreases as a function of radial position from its center. In another example, a conventional gradient index (GRIN) lens may have an index of refraction that decreases as a function of radial position from its center.

Typically, the optical lens system can be complex and involve multiple lens elements. In the case of infrared (IR) imaging optics, the lens material is usually made through diamond point turning of germanium, which can be an expensive process. Traditionally, the approach chosen to enable vacuum has been to use a crystalline germanium lid, and bond it to the FPA package. In order to minimize stresses due to differential coefficients of expansion, the FPA wafer is first singulated into die and mounted on a ceramic package. The germanium lid is then bonded to the ceramic package under very high vacuum. In spite of its high cost, germanium is selected as a lid material because of its low attenuation of infrared light in the relevant range of wavelengths.

Consequently, many micro-bolometer devices currently available for thermal imaging are bulky, expensive, and largely restricted to special use cases such as military or high-end automotive applications. Many conventional night vision cameras cost several thousands of dollars apiece, making their integration into mid- and low-range priced applications prohibitive. There is a need for a night vision thermal imaging camera core that enables a small form factor and low cost while maintaining adequate performance.

SUMMARY

According to an aspect, a gradient-index lens for focusing incident electromagnetic radiation comprises at least first and second substrates. Each of the substrates has a plurality of trenches or holes formed therein. The first substrate is stacked on the second substrate such that trenches or holes in the first substrate are substantially aligned with corresponding trenches or holes in the second substrate to form combined trenches or holes. The size and spacing of the combined trenches or holes in the stacked substrates are sufficient to produce an effective refractive index profile of the lens that is graded.

According to another aspect, a method is provided for fabricating a gradient-index lens for directing incident electromagnetic radiation. The method comprises the steps of forming a plurality of trenches or holes in at least first and second substrates, and attaching the first substrate to the second substrate such that the trenches or holes in the first substrate are substantially aligned with corresponding trenches or holes in the second substrate to form combined trenches or holes. The size and spacing of the combined trenches or holes in the attached substrates are sufficient to produce an effective refractive index profile of the lens that is graded.

According to another aspect, a gradient-index lens for focusing incident electromagnetic radiation comprises at least one substrate having first and second opposing sides. The first side has a first set of blind holes or trenches formed therein. The second side has a second set of blind holes or trenches formed therein. The size and spacing of the trenches or holes formed in both of the sides of the substrate are sufficient to produce an effective refractive index profile of the lens that is graded.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

Figure 1:
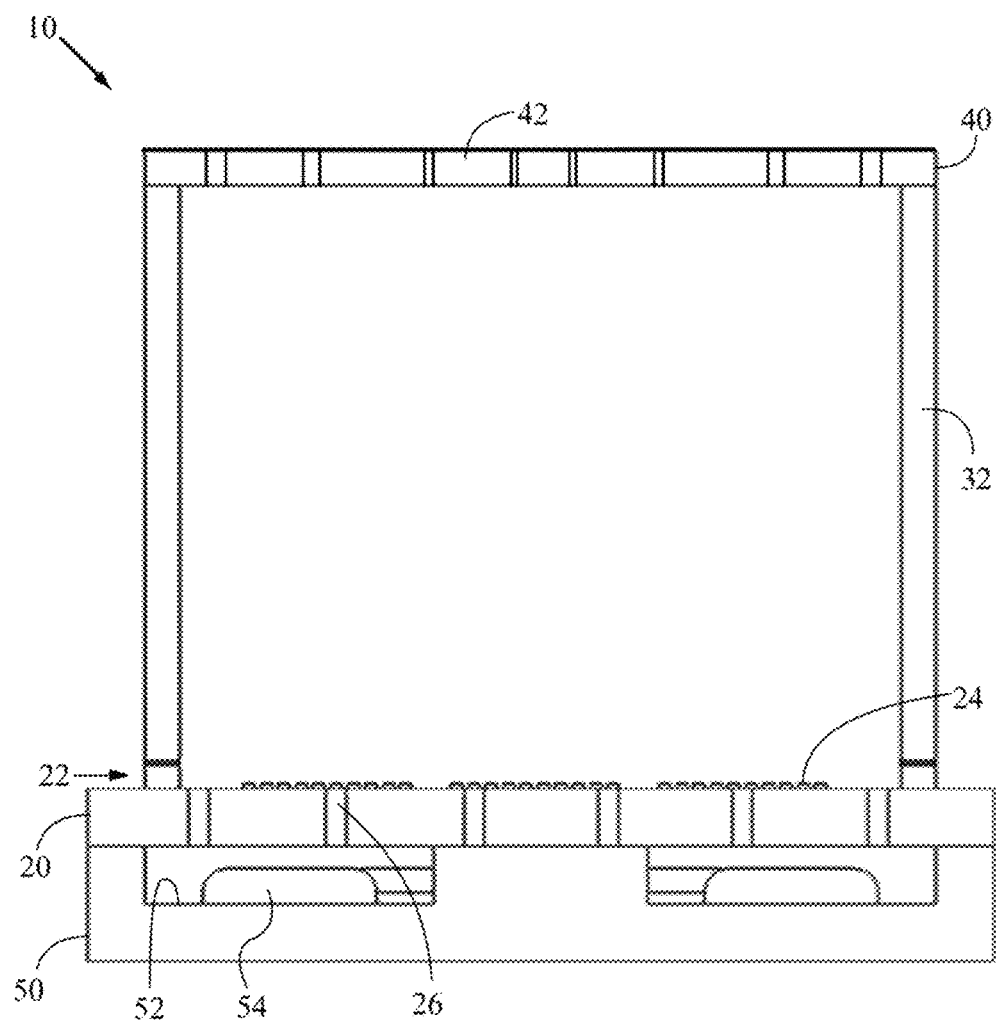
FIG. 1 is a schematic, cross-sectional view of a thermal imaging device according to some embodiments of the invention.

FIG. 1 shows an example of a thermal imaging device 10 that includes a focal plane array (FPA) 22 preferably formed on a wafer or substrate 20. The FPA 22 comprises an array of pixels 24 (e.g., a micro-bolometer or other device that converts incident electromagnetic radiation to a corresponding electrical signal). In an example of a focal plane array, the pixels are arranged in rows and columns (e.g., 40×60 pixels to 1,024×768 pixels) with a pitch in the range of about 7 μm to 50 μm. In an example of a pixel, each pixel comprises a thermistor that changes its electrical resistance in response to incident electromagnetic radiation (e.g., in the infrared wavelengths).

The device 10 also includes at least one gradient-index (GRIN) lens 42 formed in a lens substrate 40. The lens 42 is arranged to direct incident electromagnetic radiation (e.g., infrared rays) to focused spots on the pixels 24. The lens 42 has an effective refractive index profile that is graded (e.g., gradual variations in the refractive index of the lens). Such variations in the refractive index can be used to produce lenses with flat surfaces, or lenses that do not have the aberrations typical of traditional spherical lenses. Gradient-index lenses may have a refraction gradient that it spherical, axial, or radial (e.g., the effective refractive index varies as a function of radial position from the center of the lens). A spacer or standoff structure 32 may optionally be used to position the lens 42 at a desired separation from the FPA 22 (e.g., the focal length of the lens). In some examples, the separation of the lens 42 from the pixels 24 provides an optical path length in the range of 2 to 14 mm. The standoff structure 32 may be patterned, for example, from silicon (e.g., by DRIE of a SOI wafer), a metal, ceramic, glass or polymer.

The lens substrate 40 preferably encloses the pixels 24 in a vacuum in a space between the lens substrate 40 and the FPA substrate 20. The term vacuum is intended to mean a space in which the pressure is lower than atmospheric pressure. In some embodiments, the standoff structure 32 forms the vertical walls around the periphery of the enclosed space containing the pixels 24 between the lens substrate 40 and the FPA substrate 20. A hermetic seal may be formed, for example, using a fusion bonding process to bond the FPA substrate 20 and the lens substrate 40 to opposite sides of the standoff structure 32. In other embodiments, the lens substrate 40 is attached directly to the FPA substrate 20, e.g., using a fusion bonding process.

The lens substrate 40 preferably has a thickness in the range of 250 to 2000 μm to impart bending stiffness and to resist excessive deflection. In some examples, a substrate is a single crystal silicon wafer with a diameter in the range of 100 mm to 450 mm. To aid maintenance of a vacuum, a cavity substrate 50 is optionally attached to the FPA substrate 20. In some embodiments, the cavity substrate 50 has one or more cavities 52 fluidicly connected to the vacuum space between the lens substrate 40 and the FPA substrate 20 by means of vias 26 in the FPA substrate 20.

A readout circuit is electrically connected to the pixels 24. In some embodiments, a Read-Out Integrated Circuit (ROIC) underlies the FPA 22. As an example, the readout circuit may comprise an analog-to-digital converter, a signal conditioning element, a power conditioning element, a memory element and other elements to translate electromagnetic radiation incident on a pixel into a corresponding electrical signal. In some examples, a ROIC may be implemented using a CMOS process. Preferably, the FPA 22 is built on top of the ROIC on the same silicon wafer or substrate 20 and integrated with the ROIC.

Once the FPA/ROIC substrate 20 has been fabricated, the FPA 22 is preferably packaged such that it is maintained in a vacuum to minimize heat transfer between the pixels 24 and the ambient environment through atmospheric convection. Maintaining a desired level of vacuum (e.g., a pressure in the range of 0.1 to 100 mTorr) may optionally be aided by putting getter material 54 in the cavities 52. A getter is a material that, when enclosed within a vacuum, helps maintain the vacuum by removing (e.g., using a chemical reaction or by adsorption) gas particles that come in contact with it. The getter material may comprise, for example, an alloy containing zirconium and one or more of vanadium, cobalt, iron, aluminum, or titanium.

A GRIN lens is an implementation of an optical element that may be used to focus incident electromagnetic radiation. The macro-scale behavior of a metamaterial may be understood in terms of the effective medium theory (EMT). Within the context of planar refractive optical elements, EMT states that the effective refractive index $n_{eff}$ of a heterogeneous element comprising a two-dimensional array of sub-elements having a characteristic dimension L and intrinsic refractive indices $n_1$ and $n_2$ is given approximately by a weighted average of $n_1$ and $n_2$ for incident wavelengths $\lambda$ satisfying $\lambda \gg L$ (e.g., $\lambda > 10$ L). The exact effective refractive index is typically determined numerically through the use of electromagnetic simulation software (e.g., OptiFDTD commercially available from Optiwave), including the effects of polarization and incident plane angle.

In the planar GRIN lens 42, a pattern of micro-features may be varied spatially across the area of the lens to tailor the resulting refractive properties of the overall element. The micro-features (e.g., trenches, curved trenches, holes, posts or pillars) can vary in their size, spacing, and placement. Each of the micro-features preferably has at least one dimension (e.g., width or diameter) that is less than the wavelength of the electromagnetic radiation incident on the lens 42. The term "less than the wavelength of the electromagnetic radiation" represents cases in which a size of a dimension (e.g., the width of a micro-feature or the spacing between adjacent micro-features) should be smaller than a wavelength of the electromagnetic radiation incident on the GRIN lens to ensure effective functioning of the lens in directing (e.g., focusing) the electromagnetic radiation. The wavelengths at which each GRIN lens is operated may be different, and therefore the size of the dimension that is less than the wavelength of the electromagnetic radiation may also be different in different applications of the lens.

The electromagnetic radiation typically has a wavelength in the range of 1 to 15 micrometers (μm) for many applications of the lens (e.g., for directing infrared rays in the near, mid and far-infrared wavelength ranges). In some LWIR embodiments, the electromagnetic radiation has a wavelength in the range of 8 to 15 μm. Each of the micro-features preferably has at least one dimension that is in the range of 150 nm to 15 μm and that is less than the wavelength of the electromagnetic radiation for the intended operation of the lens. Similarly, the spacing between adjacent micro-features is preferably in the range of 150 nm to 15 μm and less than the wavelength of the electromagnetic radiation for the desired application of the lens. In some embodiments, the shortest dimension of each of the micro-features (e.g., its width or diameter) and the spacing between adjacent micro-features are both less than 15 μm, more typically less than 8 μm, and in some embodiments less than 2 μm or 1 μm. To create optimized lenses, materials with low absorption in the wavelength range of interest are advantageous to mitigate transmission losses through the GRIN lens. Materials with suitable properties for infrared applications include, for example, germanium (Ge), silicon (Si), zinc sulfide (ZnS), zinc selenide (ZnSe), and chalcogenide glass. In some cases Si has the further benefit of enabling lower cost.

In general, the pattern of the micro-features formed in the planar GRIN lens 42 may be varied as an arbitrary function of position across the lens element to impart a corresponding profile for the effective index of refraction. The in-plane pattern of the micro-features in a planar GRIN lens is analogous to the out-of-plane surface profile of a traditional lens in terms of providing a mechanism for tailoring the refractive properties of the resulting lens. In some implementations of a planar GRIN lens, it may be advantageous to have air or vacuum as one of the refractive sub-elements. For the purposes of the present disclosure, both air and vacuum substantially have an index of refraction n=1, and may thus be used interchangeably to describe a "trench" or "hole" type of micro-feature.

In some patterns for implementing the planar GRIN lens 42, the spacing of the trenches or holes may be substantially the same and the width or diameter of the trenches or holes may be changed across the lens element. In other examples, both the size and the spacing of the trenches or holes may be varied. In essence, the ratio of matrix dielectric material to air or vacuum determines the effective refractive index of a given unit area. In an example of a planar GRIN lens, a substrate represents a high refractive index, and a trench or hole represents a low refractive index. The trenches or holes may be formed using a variety of manufacturing techniques.

In the case of a planar GRIN lens using air or vacuum holes in a silicon wafer matrix, it may be advantageous to form the holes or trenches using traditional micro-electromechanical systems (MEMS) processes such as photolithographic pattern reproduction, thin film deposition, wet etching and deep reactive ion etching (DRIE).

In other examples, the effective density of a matrix material (e.g., a substrate) is reduced in a prescribed manner across its area to form the GRIN lens 42. In such cases, the effective refractive index of the medium may again be a weighted average of the matrix material and of air or vacuum, but with the weighting determined by the effective density of the matrix material. As an example, a silicon substrate may be modified using a porous silicon process (e.g., a process that substantially changes the density of silicon) such as electrochemical etching. The porous process forms micro-features that are pores in the matrix material to selectively reduce the effective density of the matrix material, and hence refractive index, in a manner that supports focusing or steering incident electromagnetic radiation.

Figure 2:
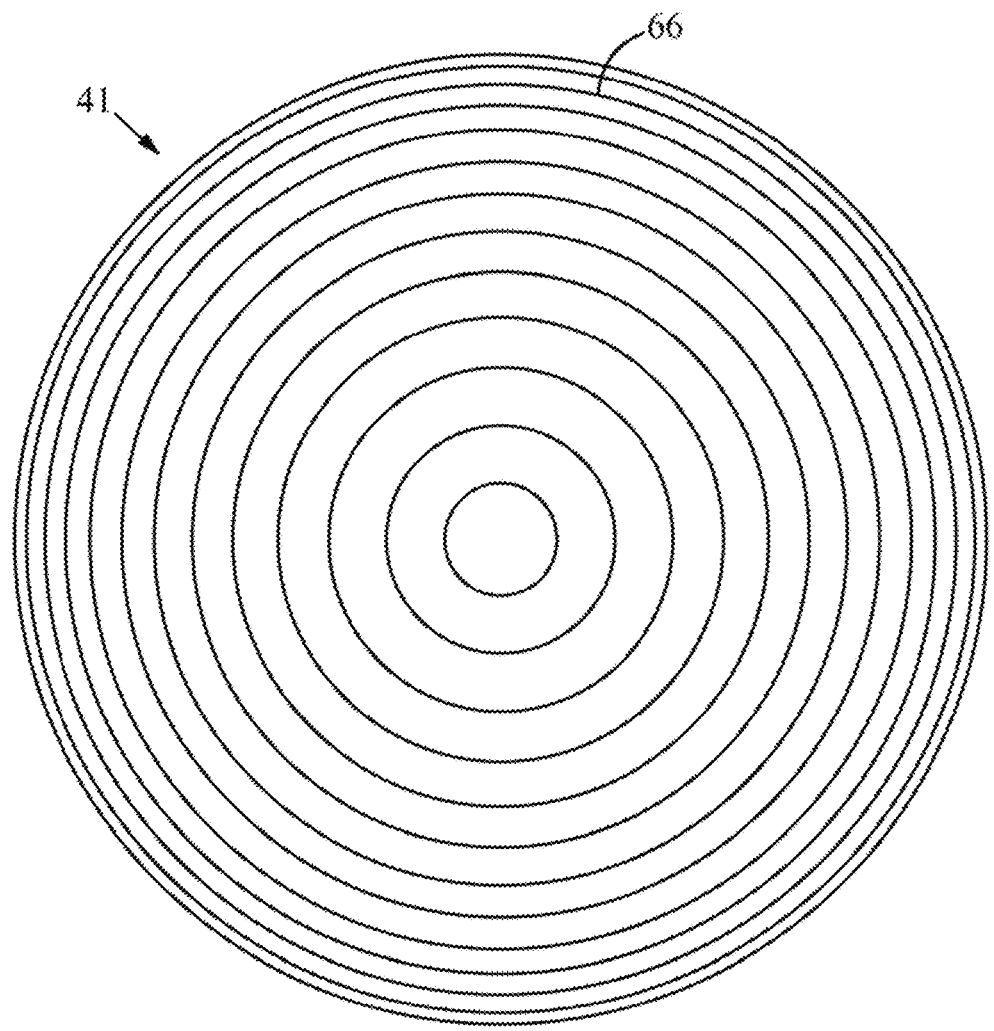
FIG. 2 is a top plan view of a gradient-index lens having concentric circular trenches, according to some embodiments of the invention.

FIG. 2 shows a first example of a GRIN lens 41 having trenches that are curved (e.g., deviating from straightness in a smooth, continuous fashion). In this example, then lens 41 has a pattern of concentric circular trenches 66. The trenches 66 are spaced apart with a spacing that is less than the wavelength of the electromagnetic radiation. For example, the spacing is in the range of 150 nm to 15 μm and is sub-wavelength. At the center of the lens 41, the trenches 66 are narrower than toward the edge of the lens where the width of the trenches 66 increases. At the edge of the lens 41 where more of the substrate material is removed, the width of the trenches 66 can increase and the spacing of the trenches 66 can decrease so that both the width and spacing are less than the wavelength of the electromagnetic radiation (e.g., the width and spacing are both in the range of 150 nm to 15 μm and are both sub-wavelength).

Figure 3:
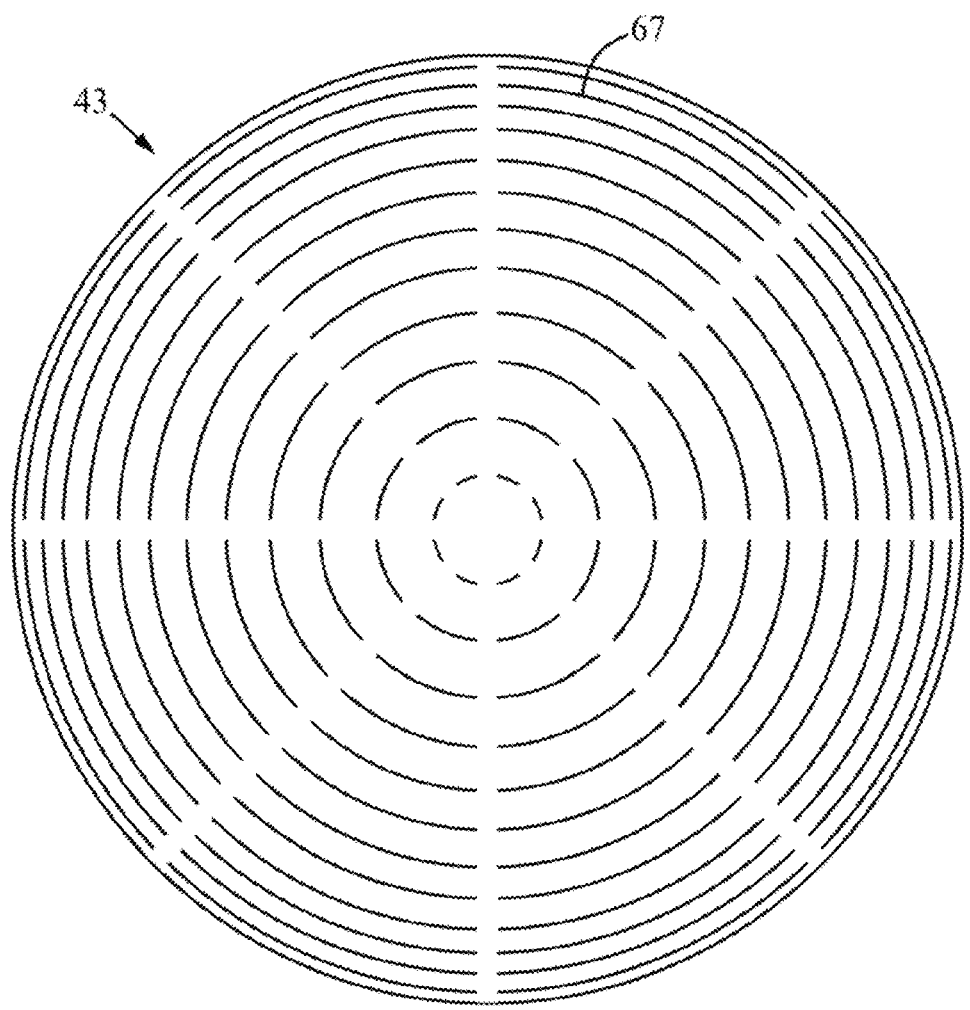
FIG. 3 is a top plan view of a gradient-index lens having sub-wavelength discontinuities in concentric circular trenches, according to another embodiment of the invention.

FIG. 3 shows another example of a GRIN lens 43 having curved trenches (e.g., trenches that deviate from straightness in a smooth, continuous fashion). In this example, the curved trenches 67 are shaped like arcs. The arc-shaped trenches 67 are arranged in a pattern of concentric circles or rings having discontinuities that are less than the wavelength of the electromagnetic radiation. The discontinuities of the concentric circles or rings are portions of the lens 43 where the substrate material remains between the trenches 67 that are formed in the lens substrate. The discontinuities typically have dimensions in the range of 150 nm to 15 um and are sub-wavelength in size. The discontinuities provide material for mechanical support, especially in the case where the trenches 67 are etched all the way through the lens substrate (e.g., a silicon wafer) and there is no base support material. Many patterns of curved trenches are possible, including trenches whose cross-sectional area is shaped like an arc, spiral, circle or ring. One advantage to curved trenches is that diffraction effects may be minimized.

Figure 4:
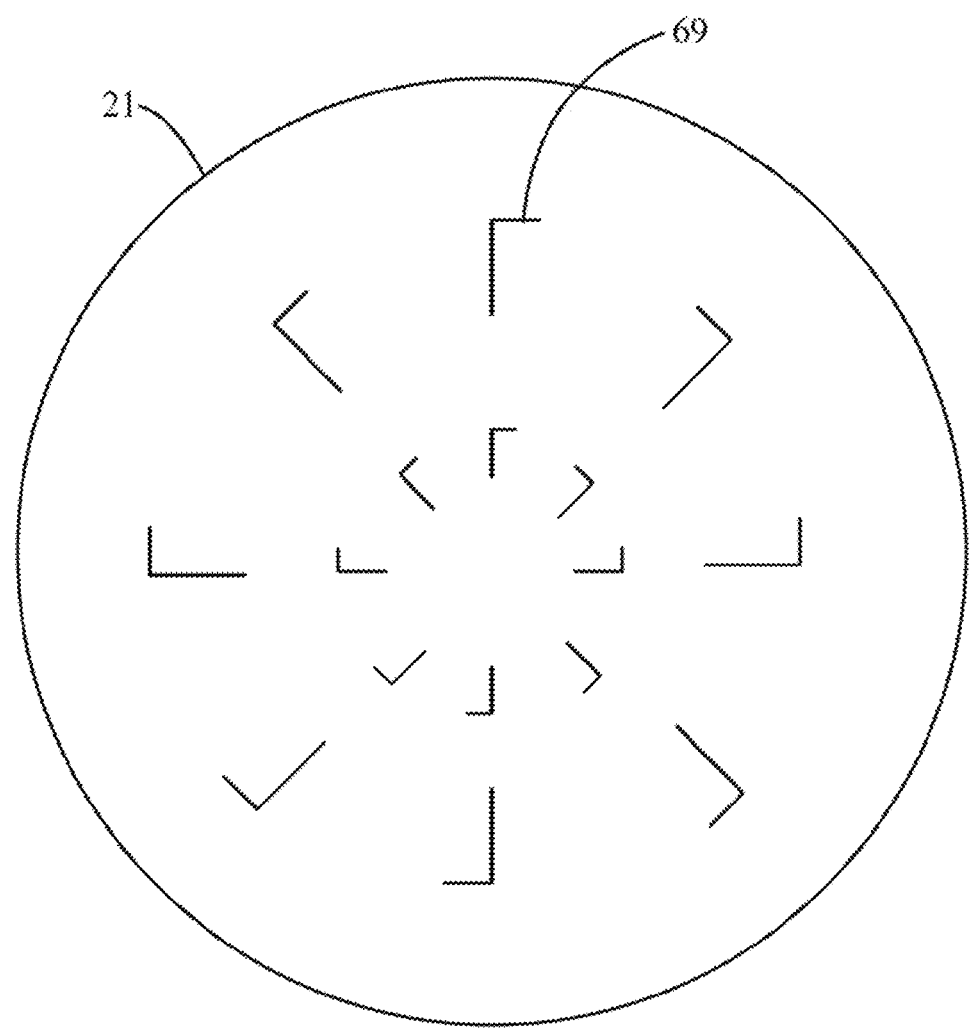
FIG. 4 is a schematic, plan view of a gradient-index lens having L-shaped trenches according to another embodiment of the invention.
Figure 5:
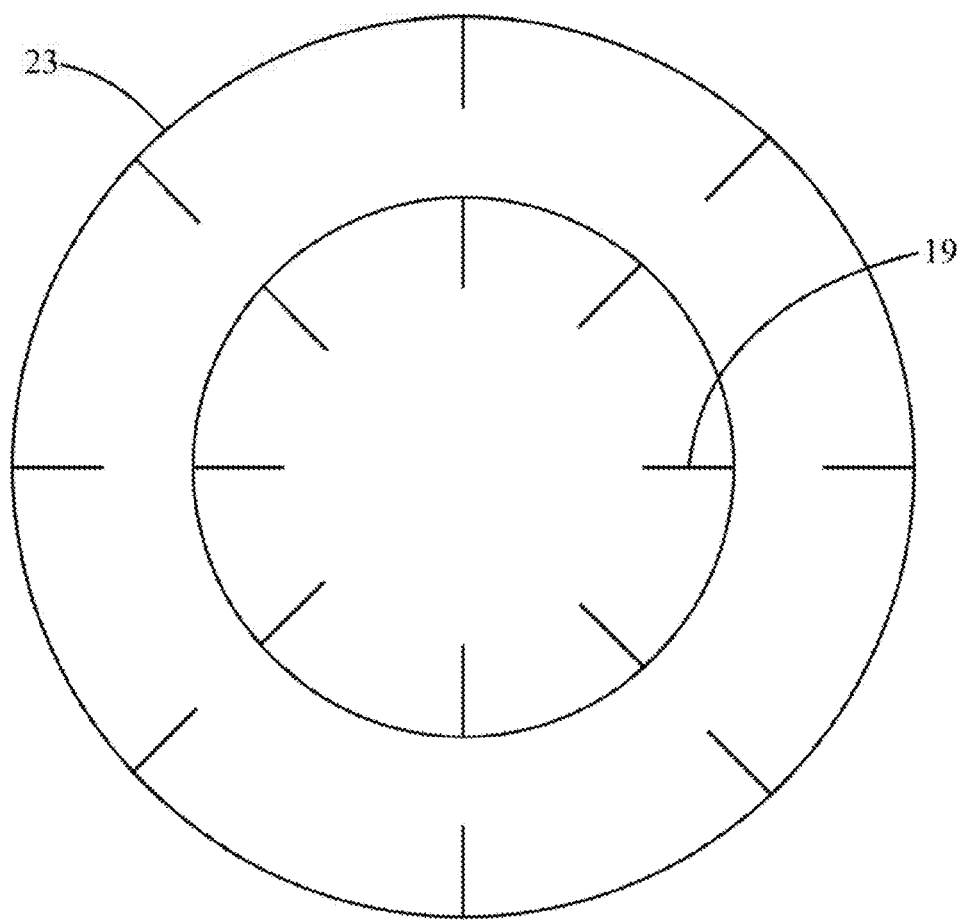
FIG. 5 is a schematic diagram of a gradient-index lens having trenches that are arranged in a pattern of spokes, according to another embodiment of the invention.
Figure 6:
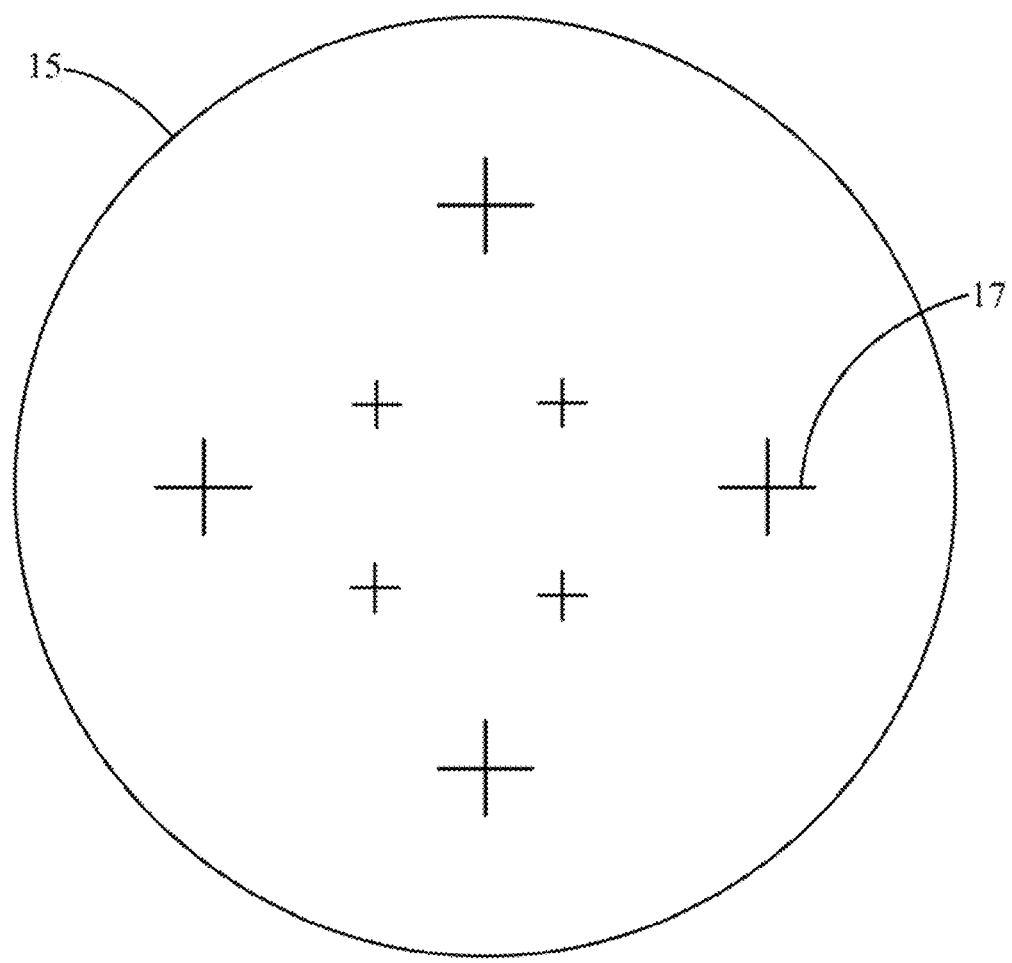
FIG. 6 is a schematic diagram of a gradient-index lens having trenches that are arranged in a pattern of crosses according to another embodiment of the invention.

FIG. 4 shows another example of a GRIN lens 21 having L-shaped trenches 69 formed in a substrate. FIG. 5 shows a GRIN lens 23 having trenches 19 that are arranged in a pattern of spokes. Radial spokes are shown in this example, but other patterns are possible including spirals to minimize diffraction effects. FIG. 6 shows a GRIN lens 15 having trenches 17 that are arranged in a pattern of crosses.

In general, the trenches may have cross sections that are shaped like arcs, spirals, circles, rings, rectangles, hexagons, L-shaped, spokes, crosses, etc. The cross section of a trench is the intersection of the trench in three-dimensional space with a plane that is substantially perpendicular to a line defining the depth of the trench. Each of the trenches preferably has a ratio of length to width that is greater than or equal to 3:1. The ratio of trench length to trench width is typically in the range of 3:1 to 100,000:1. The "length" of a trench means the longest dimension of the cross-sectional area in the plane, and "width" means the shortest dimension of the cross-sectional area. For example, if the trench has a cross-section that is shaped like a rectangle in a plane that is perpendicular to the depth line, then the length of the trench is the longest dimension of the rectangle, and the width of the trench is the shortest dimension of the rectangle. In some examples, the ratio of the length of the cross-sectional area to the width of the cross-sectional area is greater than or equal to about 50:1, and in other examples the ratio is greater than or equal to 100:1.

The trench width preferably keeps the spacing between the trenches well below the wavelength of the electromagnetic radiation, or unwanted losses can occur. When forming a trench in a substrate, the rate of etching varies inversely with trench width, and thus a very narrow trench will not be as deep as a wider trench. The narrower trenches may have a slightly greater density to compensate for the lack of depth.

Figure 7:
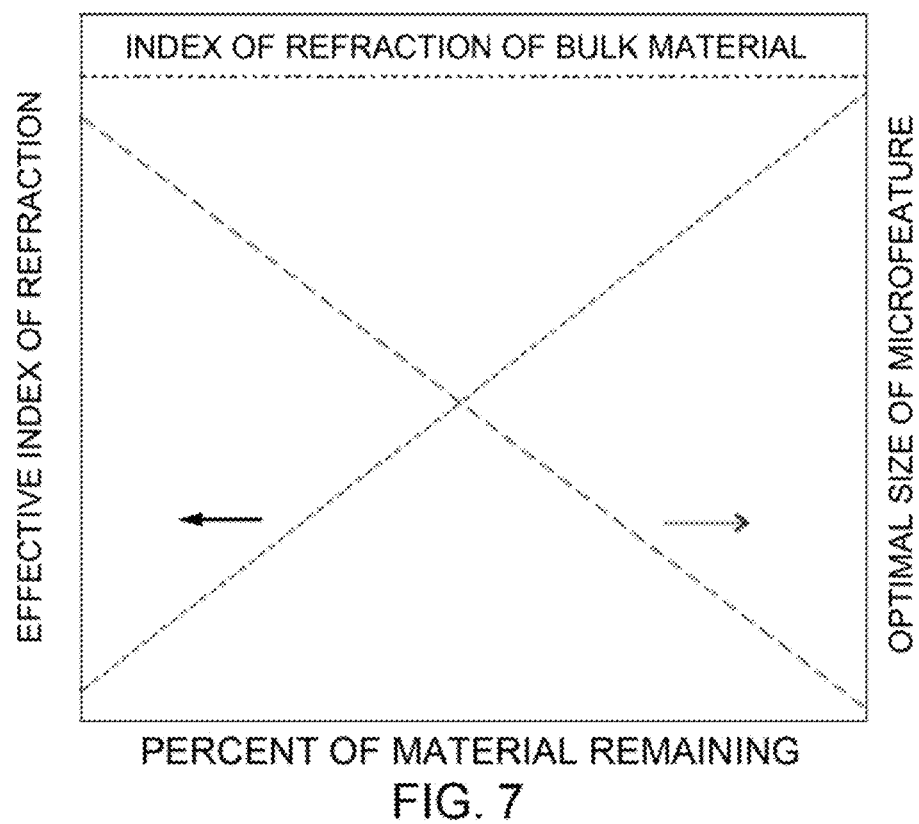
FIG. 7 shows a plot of the effective index of refraction on the left vertical axis and the corresponding micro-feature size on the right vertical axis, according to some embodiments of the invention.

FIG. 7 shows a plot of the effective index of refraction on the left vertical axis and the optimal micro-feature size on the right vertical axis. As the effective index of refraction approaches the index of the bulk material (i.e., very little material removed from the lens substrate), the optimal micro-feature size (e.g., width of the trench and spacing between adjacent trenches) should decrease. Table 1 shows examples of how to maintain micro-feature sizes well below the wavelength of light in silicon (Bulk index=3.42).

TABLE 1

| Effective Index | % Material Removed | Trench Width (μm) | Trench Spacing (μm) |
|---|---|---|---|
| 2.21 | 50% | 1 | 1.0 |
| 2.936 | 20% | 0.4 | 2.0 |
| 3.178 | 10% | 0.2 | 2.0 |
| 3.299 | 5% | 0.1 | 2.0 |

Figure 8:
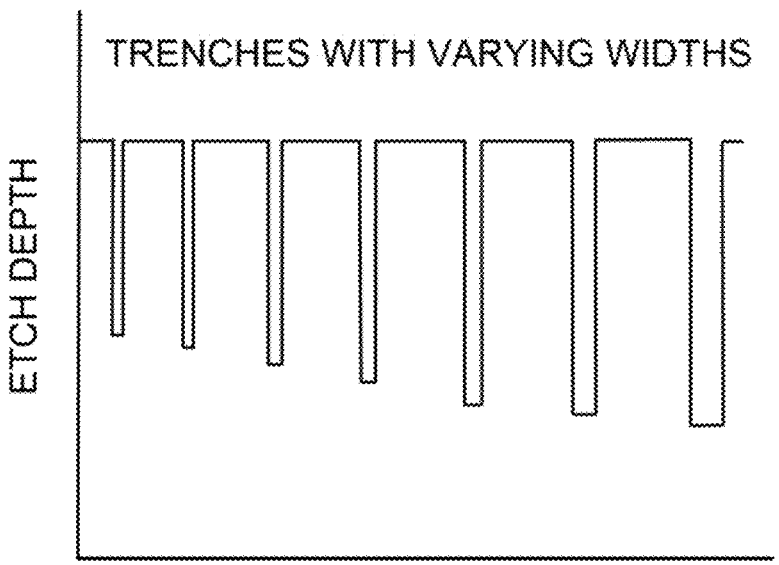
FIG. 8 is a chart of a relation between etch depth and trench width, according to some embodiments of the invention.

FIG. 8 shows the impact of decreasing trench width on etch depth; the narrower the trench the shallower the trench. To create a good GRIN lens, the effective index of refraction should be maintained over the entire depth of the GRIN lens. However, given the fundamental relationship between etch rate and trench width, the trench width may be modulated (increased) in some embodiments to account for the shallower depth. The relationship between etch depth and the modulated trench width is given approximately by the following equation (1):

$$Tf = Ti * (Dw/Dn) \quad (1)$$

where:
Tf=Final Narrow Trench Width;
Ti=Initial Narrow Trench Width;
Dw=Wide Trench Depth; and
Dn=Narrow Trench Depth.

The width of narrow (shallower) trenches may be increased slightly to compensate for the shallower trench depth. Of course, the width of the trenches can be compensated to account for other factors including but not limited to the change in etch rate due to a high density of trenches.

In some examples, the present invention provides a design and fabrication method for individual and arrays of batch fabricated GRIN lenses that may also serve as part of a wafer-level package (WLP) for a FPA within a camera core.

In some examples, a WLP comprises two or more substrates that are bonded together (e.g., using a solder, anodic, or fusion bonding process) to enclose an element requiring isolation from the ambient environment. For example, a lens may be used to focus incident infrared rays onto an imaging sensor such as a micro-bolometer-based FPA. Batch fabricated arrays of GRIN lenses may be used in configurations that simultaneously support schemes for wafer-level optics (WLO) and WLP. This approach further enables multi-spectral, super-resolution, and/or plenoptic imaging schemes.

An imaging lens system produces a focused image at the focal plane array, where the focused spot sizes in the image are ideally about the size of a pixel. While a near perfect imaging lens system will produce diffraction limited spot sizes over the entire focal plane array, it is not uncommon for an imaging lens system to be much better at the optical center of the lens system and the performance will fall off towards the edges of the focal plane array. The reduction of the performance off of the optical center of the lens system can be compensated with image processing techniques like sharpening. An imaging lens system has a characteristic Field of View related to the specific application of the imaging lens system. Imaging lens system with a narrow Field of View, typically less than 25 degrees are used in applications including imaging of circuit components on printed circuit boards and electrical wiring. Narrow field of view imaging lens systems are also used in surveillance cameras to provide detailed images of remote scenes. Imaging systems with a medium Field of View, typically between 25 to 60 degrees, are used in a range of thermal imaging applications including surveillance and security. Imaging systems with a wide Field of View, greater than 60 degrees, are used for automotive and security applications.

The production of a lens system that produces a quality image at the focal plane array may have several characteristics. The lens system may have one or more GRIN lens elements with an aspheric profile. The aspheric profile may differ greatly from a quadratic index profile. The lens system should have an aperture sized appropriately for the pixels within the focal plane array. The lens system should have a Field of View consistent with the target application. The lens system may have anti-reflection coatings on the lens surfaces to minimize reflections from the lens surfaces. The anti-reflection coating can include thin film dielectric coating and sub-wavelength structured coatings.

Figure 9:
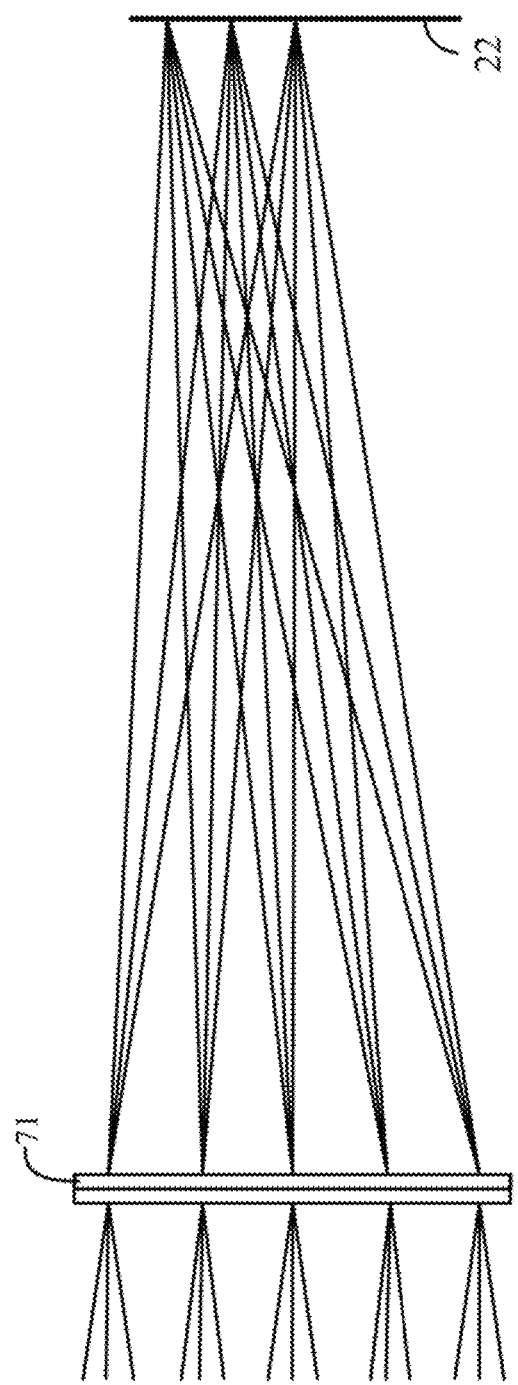
FIG. 9 is a schematic, side view of a GRIN lens directing electromagnetic radiation to focused spots on a focal plane, according to some embodiments of the invention.

FIG. 9 shows an example of an imaging lens system comprising a single etched-silicon GRIN lens 71. The lens system targets a narrow Field of View of 14.5 degrees. The diameter of the lens 71 is chosen to be 5 mm to match the size of a focal plane array 22 with 160×120 pixel micro-bolometer with 17 μm pixels, and a 3.4 mm diagonal. The lens 71 is created by etching micro-features (e.g., trenches or holes having a width or diameter of 1 μm), 145 μm deep on a 350 μm thick silicon substrate. The coefficients of the index profile for the lens system are in Table 2. The index profile of the lens is an aspheric profile.

This surface has the same shape as the Standard surface, with media whose index of refraction described by $$n^2 = n_0 + n_{r2}r^2 + n_{r4}r^4 + n_{r6}r^6 + n_{r8}r^8 + n_{r10}r^{10} + n_{r12}r^{12},$$

where $r^2 = x^2 + y^2$ (2)

TABLE 2

| | |
|---|---|
| n0 | 1.1560E+01 |
| nr2 | −1.8769E+00 |

TABLE 2-continued

| | |
|---|---|
| nr4 | 1.6137E−01 |
| nr6 | −2.8632E−02 |
| nr8 | 3.9672E−03 |
| nr10 | −2.0614E−04 |

Figure 10:
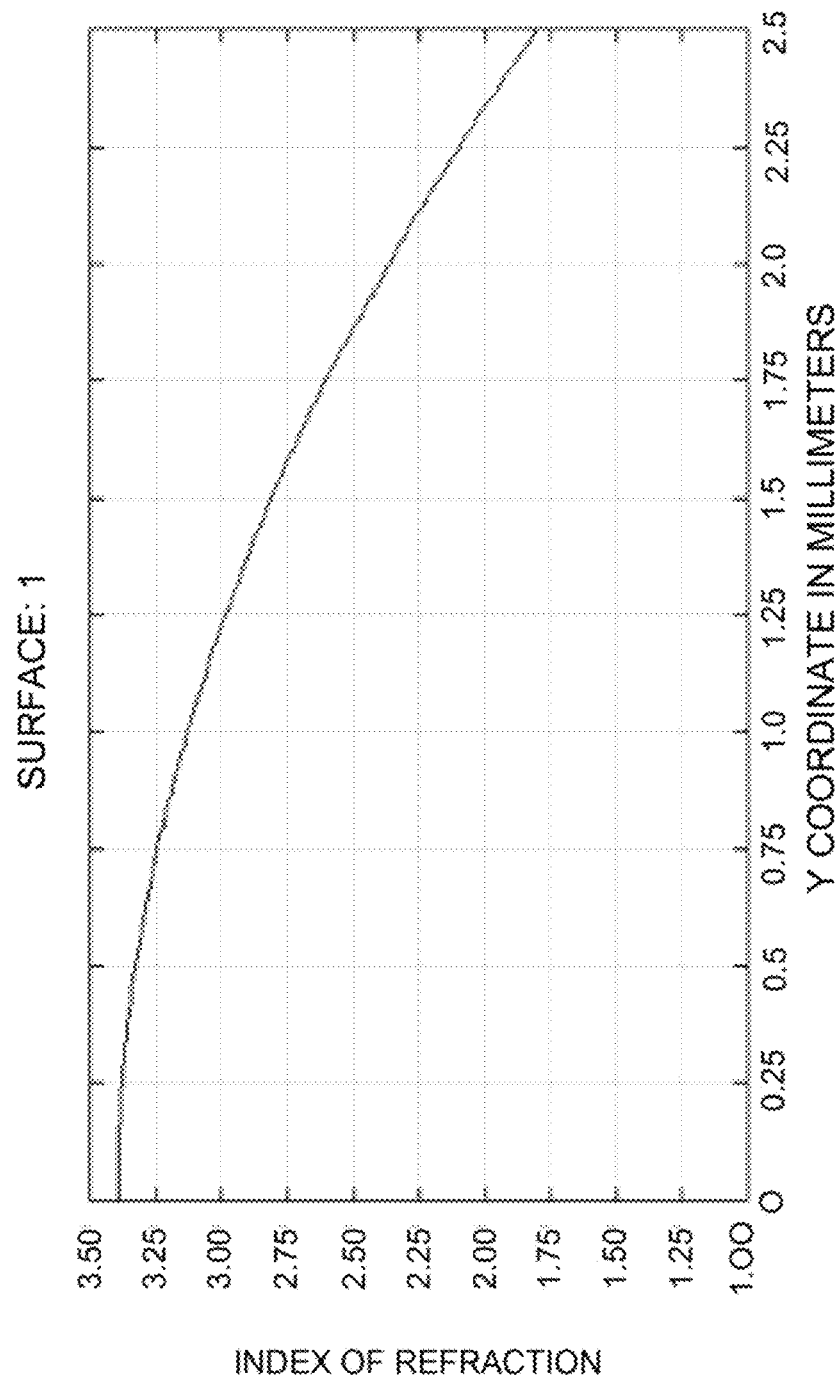
FIG. 10 is a graph showing an example of an effective index profile resulting from a combination of aspheric index coefficients, according to some embodiments of the invention.

FIG. 10 shows the resulting effective refractive index profile from this combination of aspheric index coefficients. The index profile is at the index of bulk silicon at the center of the lens (Bulk index=3.42), thus no trenches or holes are etched into the center of the lens. The index drops to 1.8 at the edge of the lens. To produce an effective refractive index of 1.8, 66% of the material is etched away at the edges of the lens.

Referring again to FIG. 9, the imaging lens 71 produces a set of focused spots at the focal plane array 22. The strehl ratio of the different field points varies from 0.965, nearly a perfectly focused spot, at the center to 0.454 at the most extreme field point. The minimum spot size is 25 μm, close to the target pixel size of 17 μm. The lens has a diameter of 5 mm. The focal length of the lens is 13.4 mm, and the f-number (f/#) for the lens is 2.68. The f-number divided by the diameter (d) of the lens (f/#/d) is a parameter related to the strength of the lens. In this example, the f-number divided by the diameter of the lens (f/#/d)=2.68/5=0.536.

If we divide the f/# by the diameter of the lens, then we get a parameter that is nominally independent of lens radius. A stronger lens produces a smaller parameter. The f-number divided by the diameter of the lens (f/#/d) is preferably less than or equal to 1.5 (e.g., in the range of 0.05 to 1.5). Table 3 shows examples for lenses having diameters in the range of 1 to 5 mm, focal lengths in the range of 1.44 to 37.4 mm, and effective refractive indexes in the range from 1.5 (at the edges of the lens) to 3.4 (at the center of the lens). For smaller lenses, the f/# generally improves (f/#=focal length/diameter).

TABLE 3

| Diameter | Focal length | f/# | f/#/d | Depth of trenches or holes in lens |
|---|---|---|---|---|
| 5 mm | 37.4 mm | 7.48 | 1.496 | 50 um depth |
| 4 mm | 23.9 mm | 5.975 | 1.494 | 50 um depth |
| 3 mm | 13.4 mm | 4.47 | 1.489 | 50 um depth |
| 2 mm | 5.95 mm | 2.975 | 1.488 | 50 um depth |
| 1.5 mm | 3.33 mm | 2.22 | 1.480 | 50 um depth |
| 1 mm | 1.44 mm | 1.44 | 1.440 | 50 um depth |
| 5 mm | 13.39 mm | 2.678 | 0.536 | 145 um depth |

Figure 11:
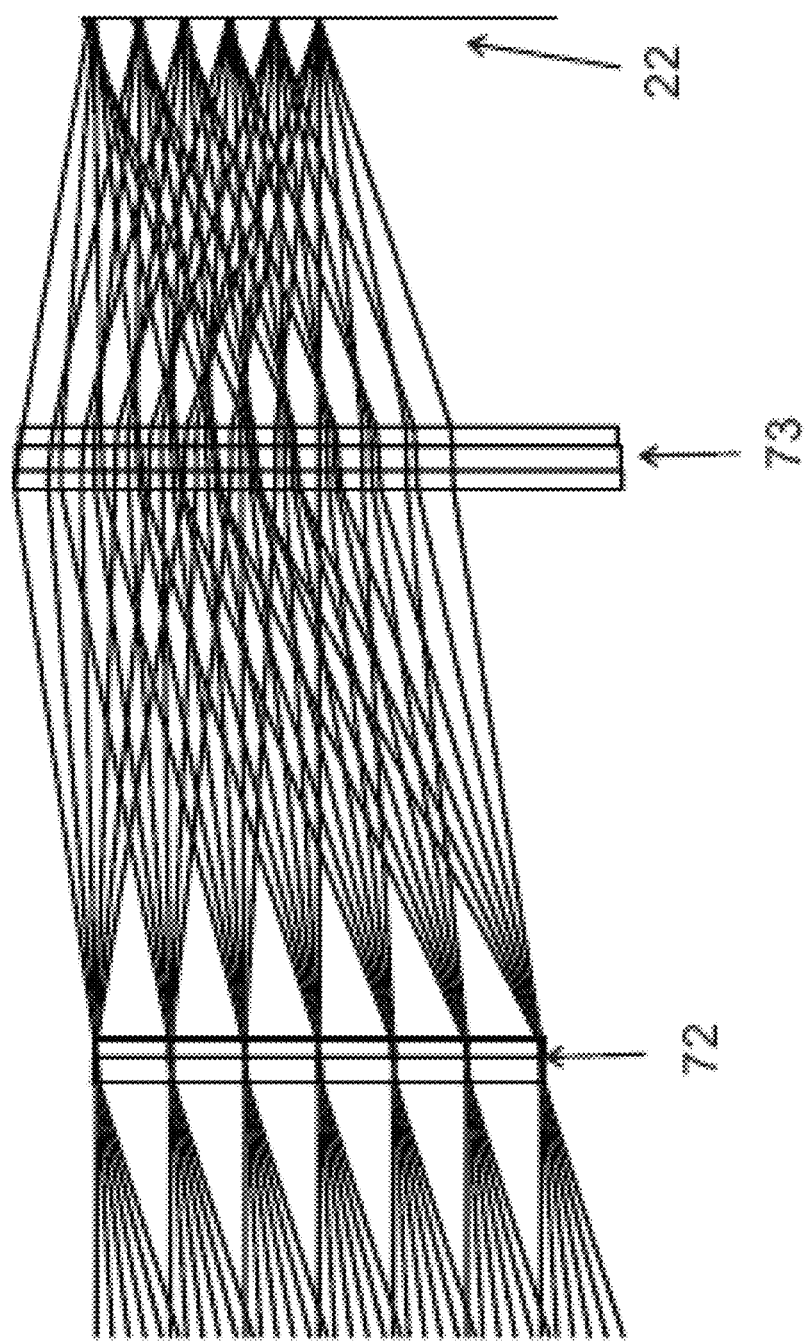
FIG. 11 is a schematic, side view of two GRIN lenses arranged to direct electromagnetic radiation to focused spots on a focal plane, according to some embodiments of the invention.

FIG. 11 shows an example of an imaging lens system comprising two GRIN lenses 72, 73 etched in silicon. The lens system targets a medium Field of View of 35 degrees. The diameter of the lens is chosen to be 3.5 mm to match the size of a 160×120 pixel micro-bolometer with 17 μm pixels, and a 3.4 mm diagonal. The lens system is created by etching micro-features (e.g., trenches or holes having a width or diameter of 1 μm), 150 μm deep on a 350 μm thick silicon substrate on the first etched GRIN lens 72 and 150 μm deep on both sides of a second 500 μm thick substrate to form the second lens 73.

Figure 12:
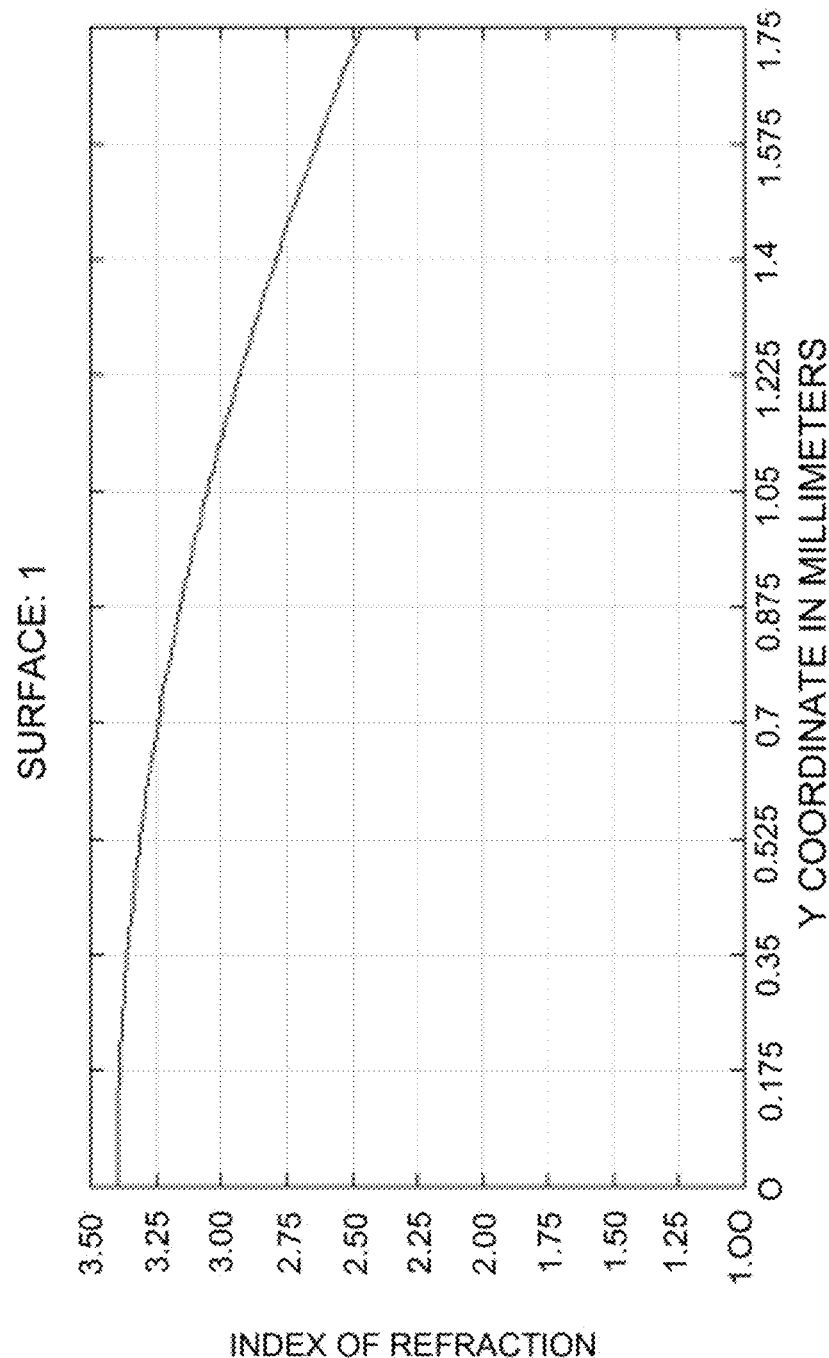
FIG. 12 is another graph showing an example of an effective index profile resulting from a combination of index coefficients, according to some embodiments of the invention.
Figure 13:
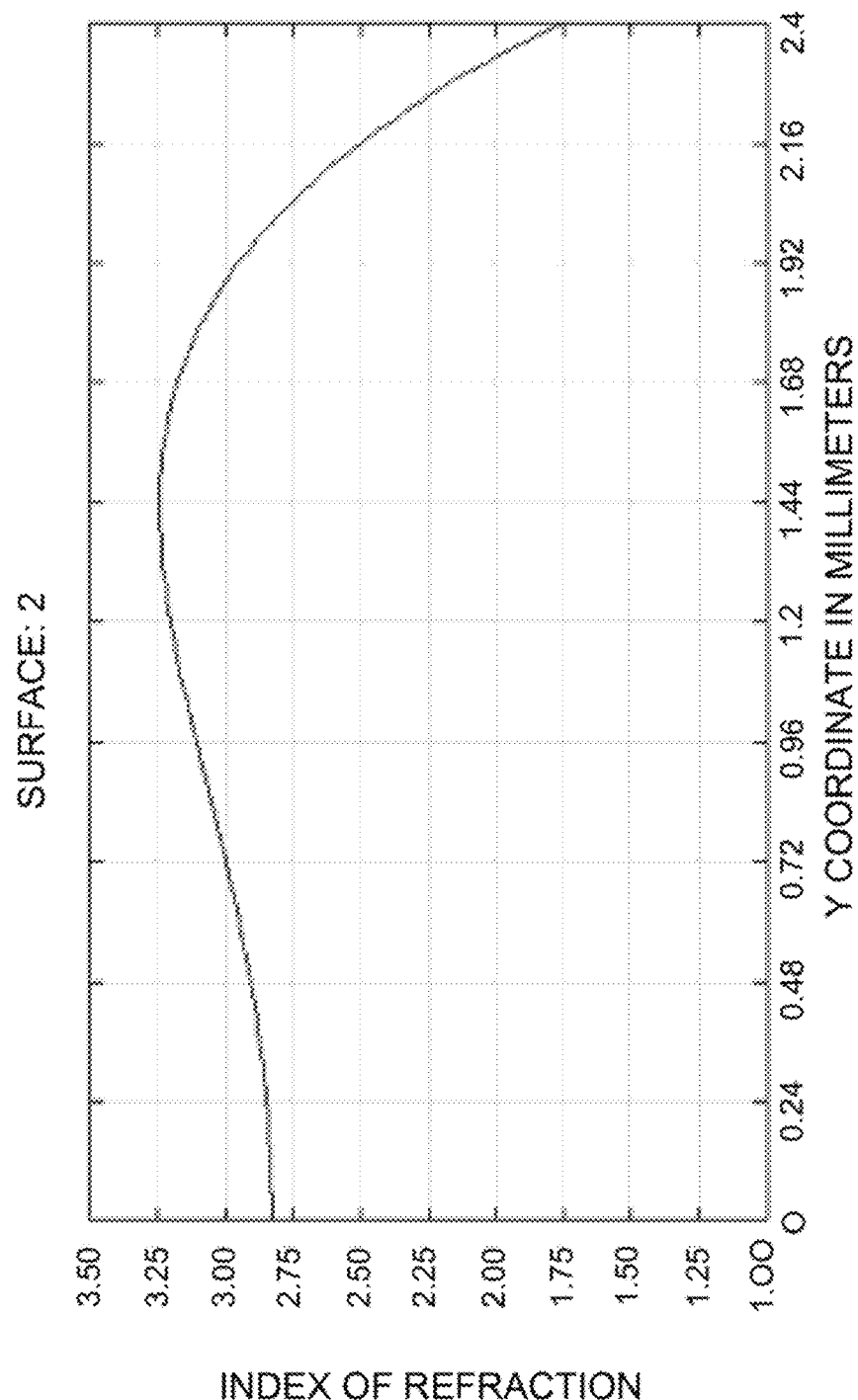
FIG. 13 is another graph showing an example of an effective index profile resulting from a combination of index coefficients, according to some embodiments of the invention.
Figure 14:
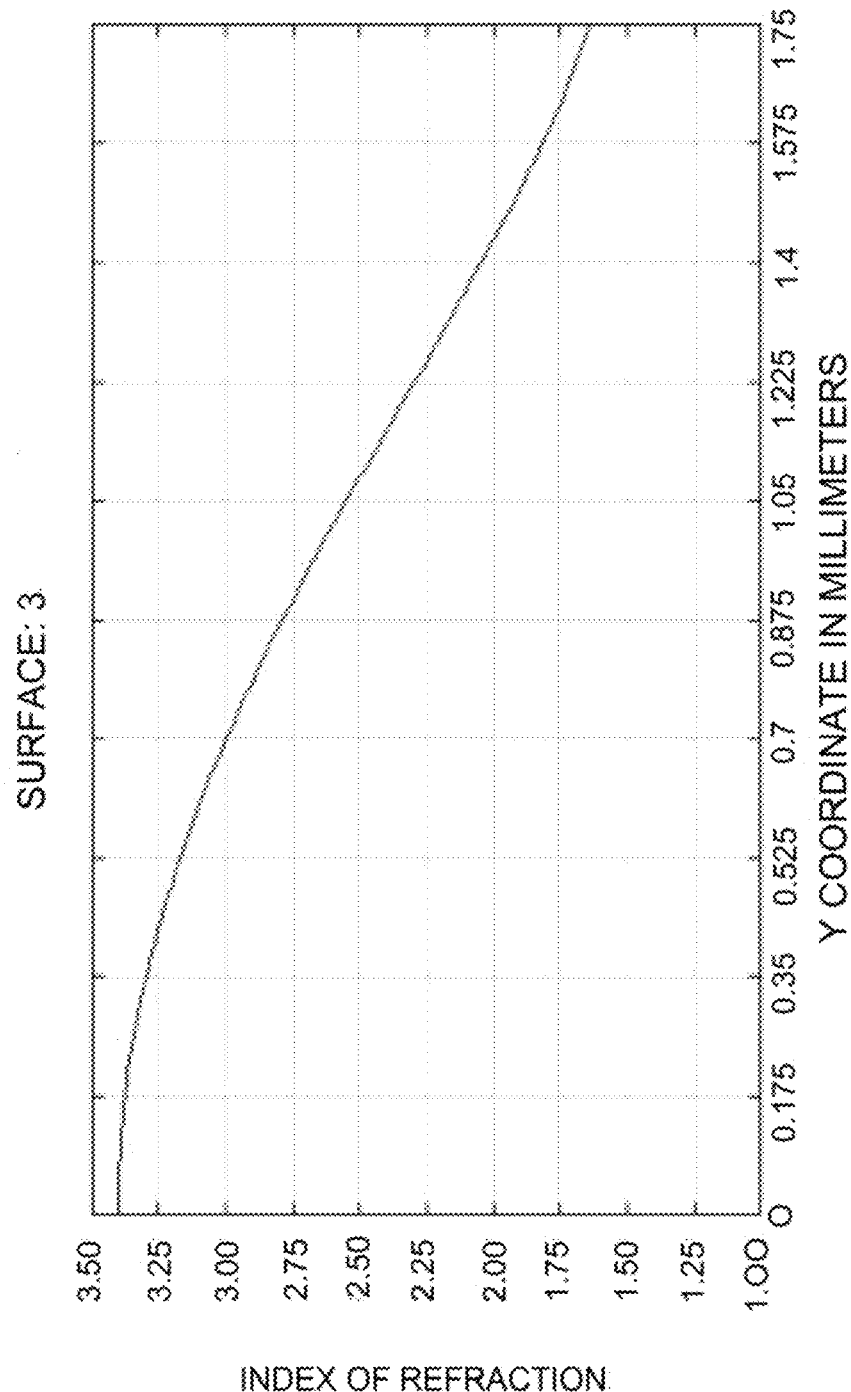
FIG. 14 is another graph showing an example of an effective index profile resulting from a combination of index coefficients, according to some embodiments of the invention.

The lens system uses three GRIN lens surfaces to achieve the steering functions to produce a good image quality over the entire focal plane array 22. The index of refraction profiles of the three GRIN lens surfaces are shown in FIG. 12, FIG. 13, and FIG. 14, respectively. The coefficients of the GRIN lens surfaces are shown in Table 4.

TABLE 4

|     | First GRIN   | Second GRIN  | Third GRIN   |
|-----|--------------|--------------|--------------|
| n0  | 1.1560E+01   | 8.0000E+00   | 1.1560E+01   |
| nr2 | −2.1875E+00  | 2.0000E+00   | −5.8005E+00  |
| nr4 | 1.9556E−01   | −6.2124E−02  | 1.1448E+00   |
| nr6 | −5.8514E−02  | −2.0945E−01  | −2.7864E−02  |
| nr8 | 1.9406E−02   | 2.9043E−02   | −1.8085E−02  |
| nr10| −2.4066E−03  | −9.9689E−04  | 2.0056E−03   |

The strehl ratio of the different field points varies from 0.965, nearly a perfectly focused spot, at the center to 0.71 at the most extreme field point. The minimum spot size is 15 μm, close to the target pixel size of 17 μm. The lens system has a 3.5 mm diameter and a 5.5 mm focal length with a resulting working f-number of 1.62. In this example, the f-number divided by the diameter of the lens system (f/#/d)=1.62/3.5=0.463.

Figure 15:
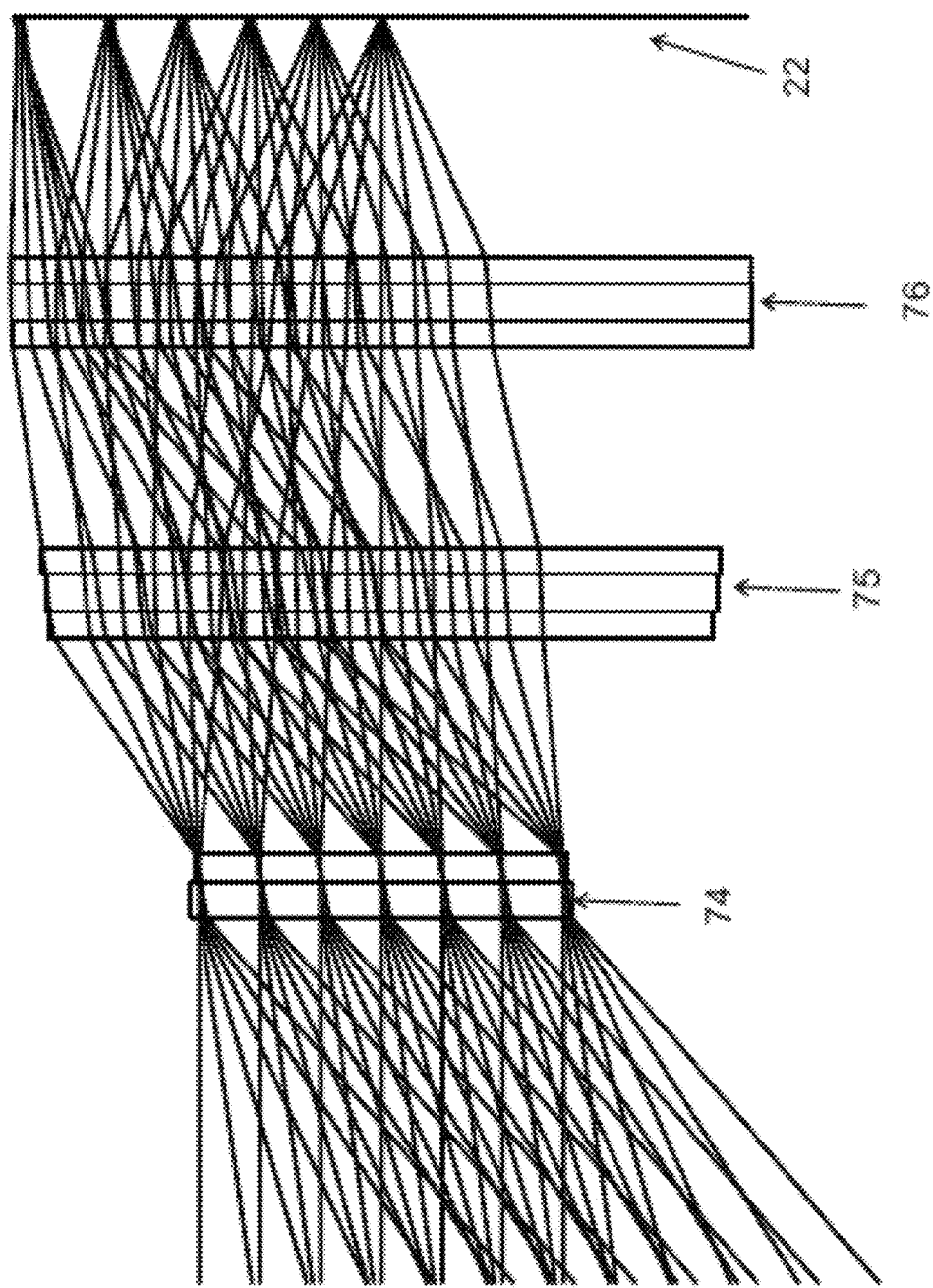
FIG. 15 is a schematic, side view of three GRIN lenses arranged to direct electromagnetic radiation to focused spots on a focal plane, according to some embodiments of the invention.

FIG. 15 shows an example of an imaging lens system comprising three GRIN lenses 74, 75 and 76. The lens system targets a wide Field of View of 80 degrees. The diameter of the first to lens 74 is chosen to be 2.0 mm and the interior lenses 75, 76 are 3.8 mm and 4.1 mm in diameter, respectively, to match the size of a 160×120 pixel micro-bolometer with 17 μm pixels, and a 3.4 mm diagonal. Micro-features are etched in silicon (e.g., trenches or holes having a width or diameter of 1 μm), 150 μm deep on a 350 μm thick silicon wafer for the first lens 74, 150 μm deep on both sides of a second 500 μm thick wafer for the second lens 75, and 150 μm deep on both sides of a third 500 μm thick wafer for the third lens 76.

Figure 16:
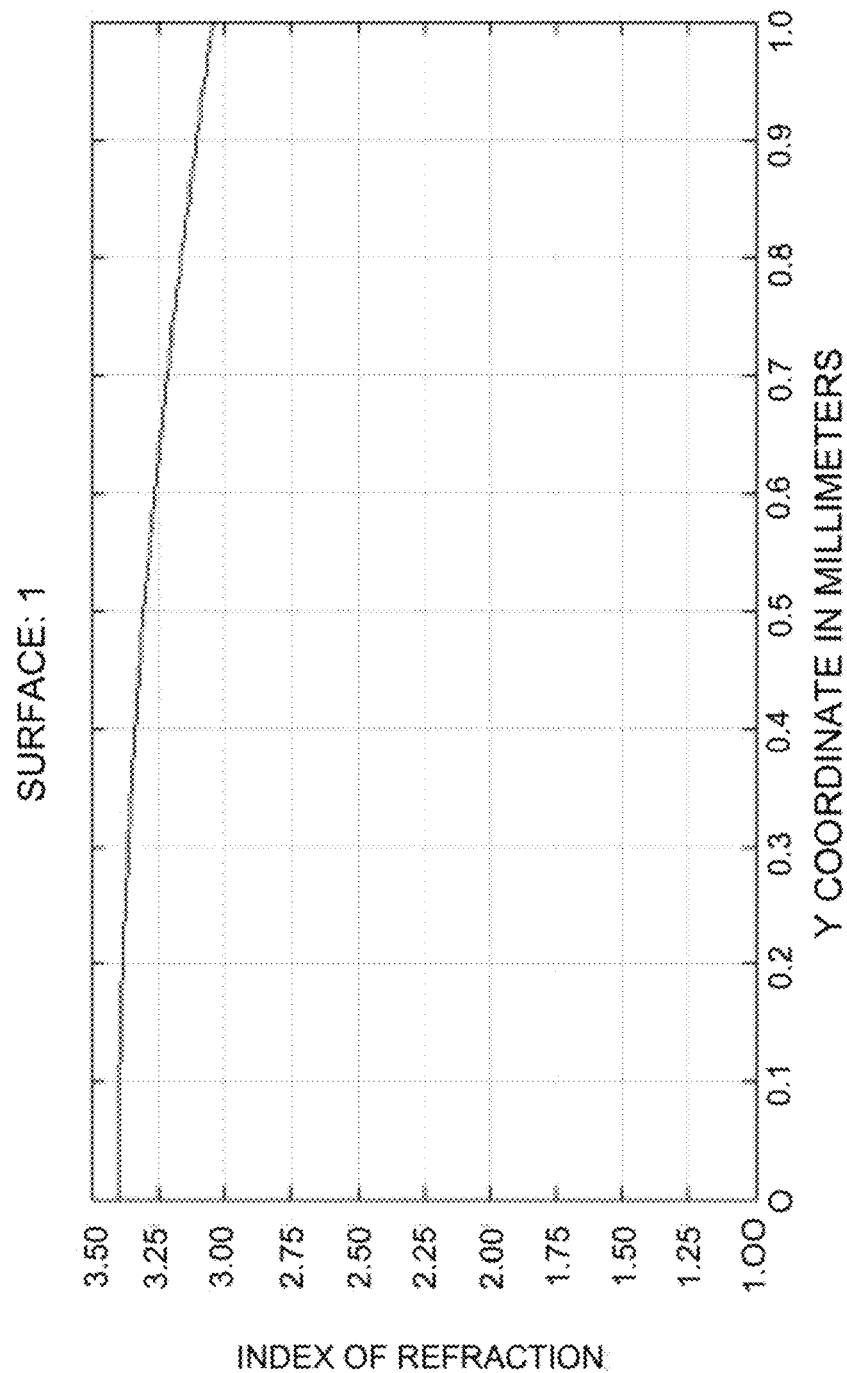
FIG. 16 is another graph showing an example of an effective index profile resulting from a combination of index coefficients, according to some embodiments of the invention.
Figure 17:
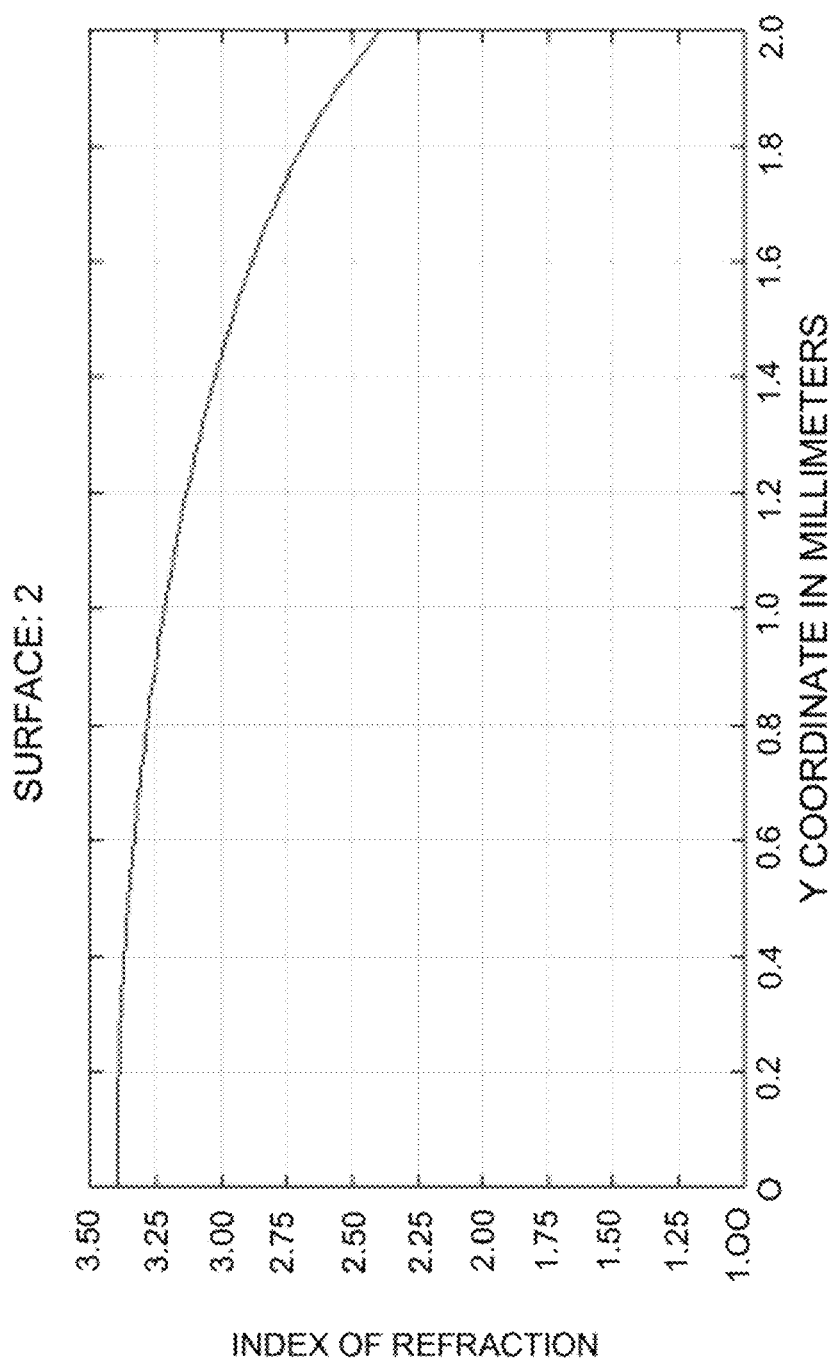
FIG. 17 is another graph showing an example of an effective index profile resulting from a combination of index coefficients, according to some embodiments of the invention.
Figure 18:
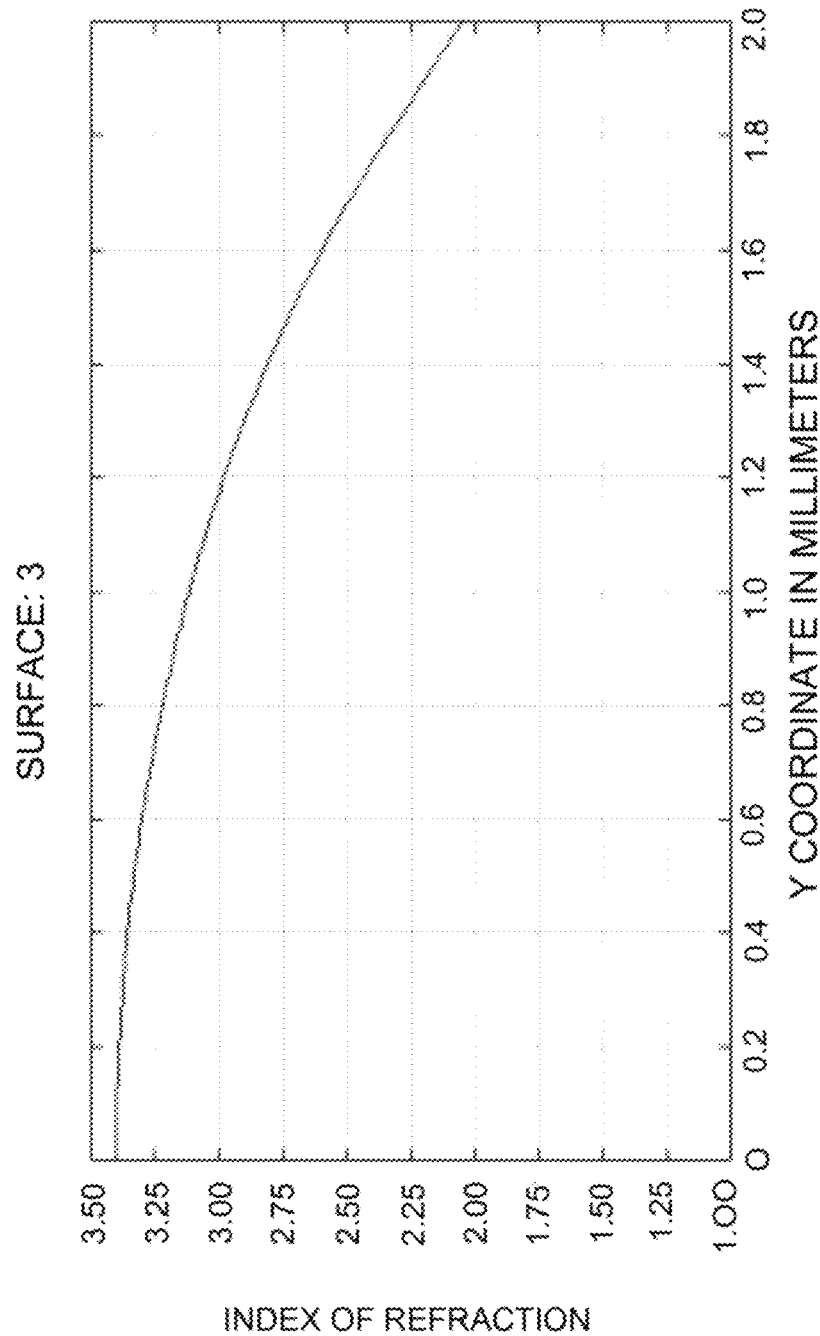
FIG. 18 is another graph showing an example of an effective index profile resulting from a combination of index coefficients, according to some embodiments of the invention.
Figure 19:
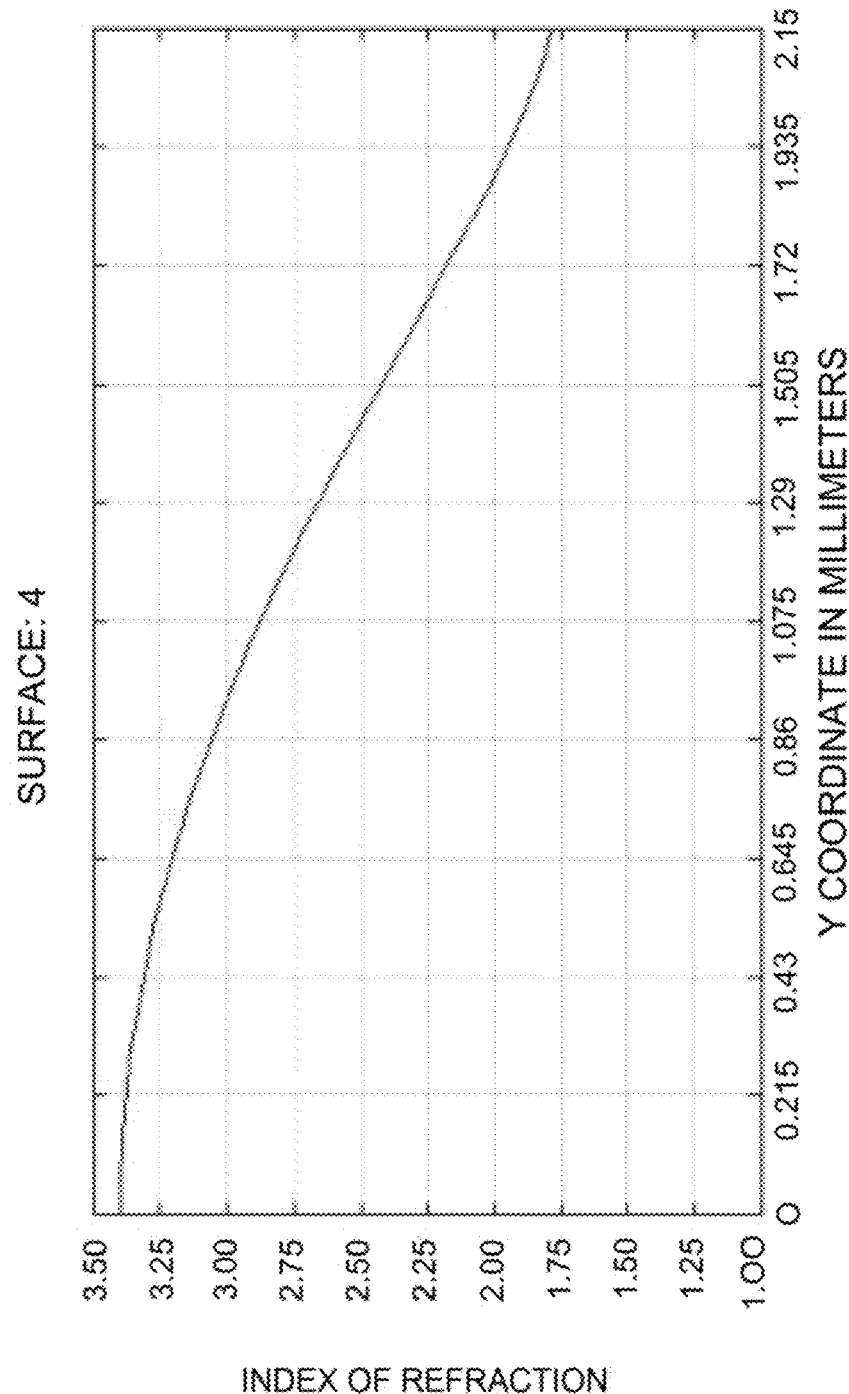
FIG. 19 is another graph showing an example of an effective index profile resulting from a combination of index coefficients, according to some embodiments of the invention.
Figure 20:
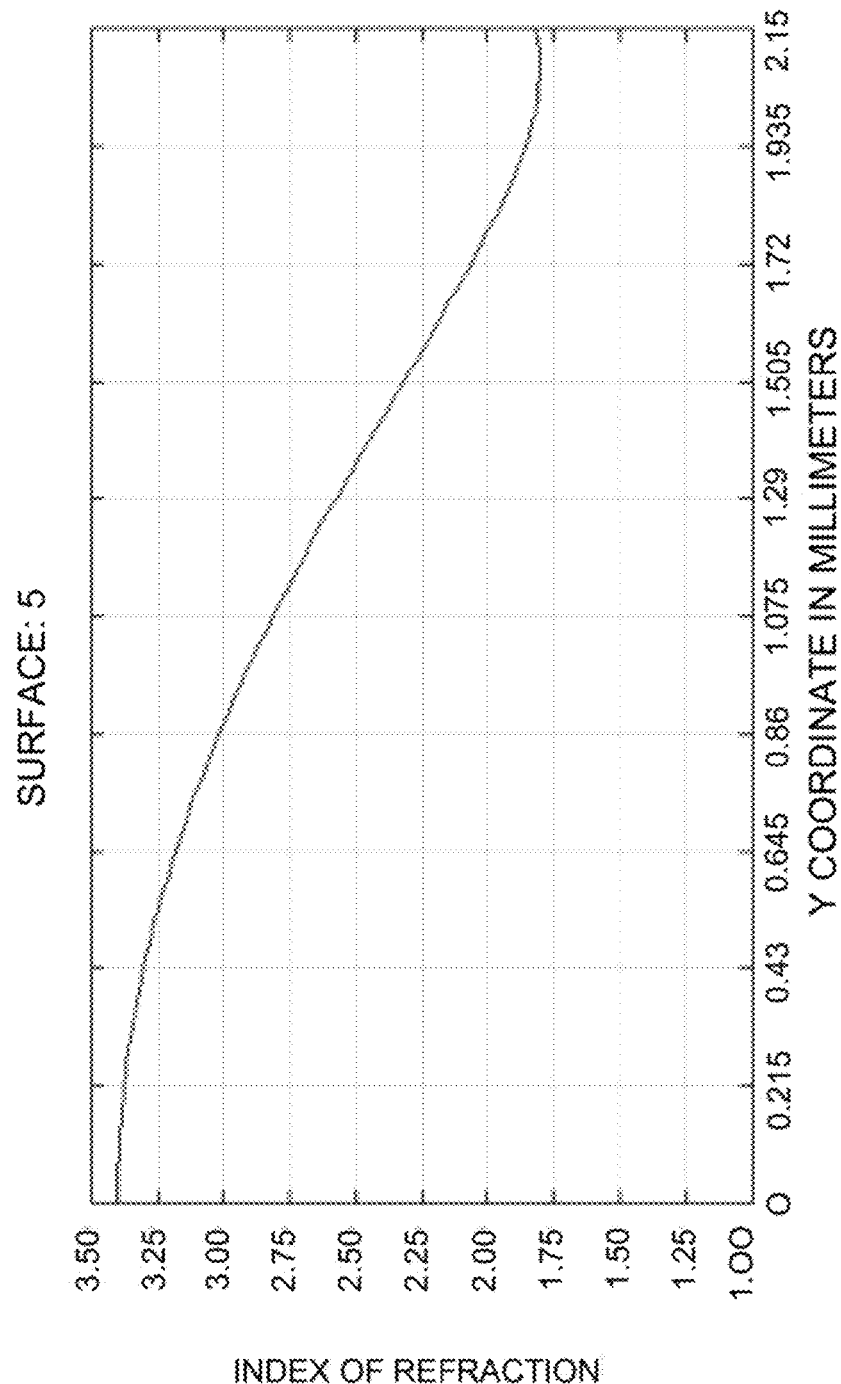
FIG. 20 is another graph showing an example of an effective index profile resulting from a combination of index coefficients, according to some embodiments of the invention.

The lens system uses five GRIN lens surfaces to achieve the steering functions to produce a good image quality over the entire focal plane array 22. The index of refraction profiles of the five GRIN lens surfaces are shown in FIG. 16. FIG. 17, FIG. 18, FIG. 19 and FIG. 20, respectively. The coefficients of the GRIN lens surfaces are shown in Table 5:

TABLE 5

|     | First GRIN   | Second GRIN  | Third GRIN   | Fourth GRIN  | Fifth GRIN   |
|-----|--------------|--------------|--------------|--------------|--------------|
| n0  | 1.1560E+01   | 1.1560E+01   | 1.1560E+01   | 1.1560E+01   | 1.1560E+01   |
| nr2 | −2.6482E+00  | −1.2326E+00  | −1.8858E+00  | −3.1849E+00  | −3.6213E+00  |
| nr4 | 3.6805E−01   | 4.5315E−02   | 4.5359E−02   | 2.9811E−01   | 4.0120E−01   |
| nr6 | −2.7546E−03  | −1.8849E−02  | −2.3057E−02  | 9.1686E−03   | 6.9815E−03   |
| nr8 | −7.7755E−03  | −1.4555E−03  | 6.5004E−06   | −7.3609E−04  | −7.0091E−03  |
| nr10| 3.2197E−03   | −6.2757E−05  | 9.0594E−04   | 1.0071E−04   | 1.1407E−03   |

The strehl ratio of the different field points varies from 0.91, nearly a perfectly focused spot at the center, to 0.83 at the most extreme field point. The minimum spot size is 12 μm, below the target pixel size of 17 μm. The lens system has a 2.0 mm aperture and a 2.5 mm focal length with a resulting working F-number of 1.27. In this example, the f-number divided by the diameter of the lens system (f/#/d)=1.27/2=0.635.

In the previous examples, wider field of views typically require more GRIN surfaces to achieve the steering of the electromagnetic radiation to be focused onto the FPA. These specific examples are meant to illustrate the principles of the optical design of various etched silicon GRIN lens systems, and are not limiting the to the scope. Many other values may be selected for the specific depths, trench or hole sizes, and index coefficients, as well as different combinations of parameters and/or materials. Other examples of imaging lens systems are possible using other lens types in combination with the etched GRIN lenses, including but not limited to refractivity etched silicon lenses, diamond turned infrared lenses, a lens formed from a porous Si process, a diffractive optic, a molded glass lens, or a Fresnel optic.

Figure 21:
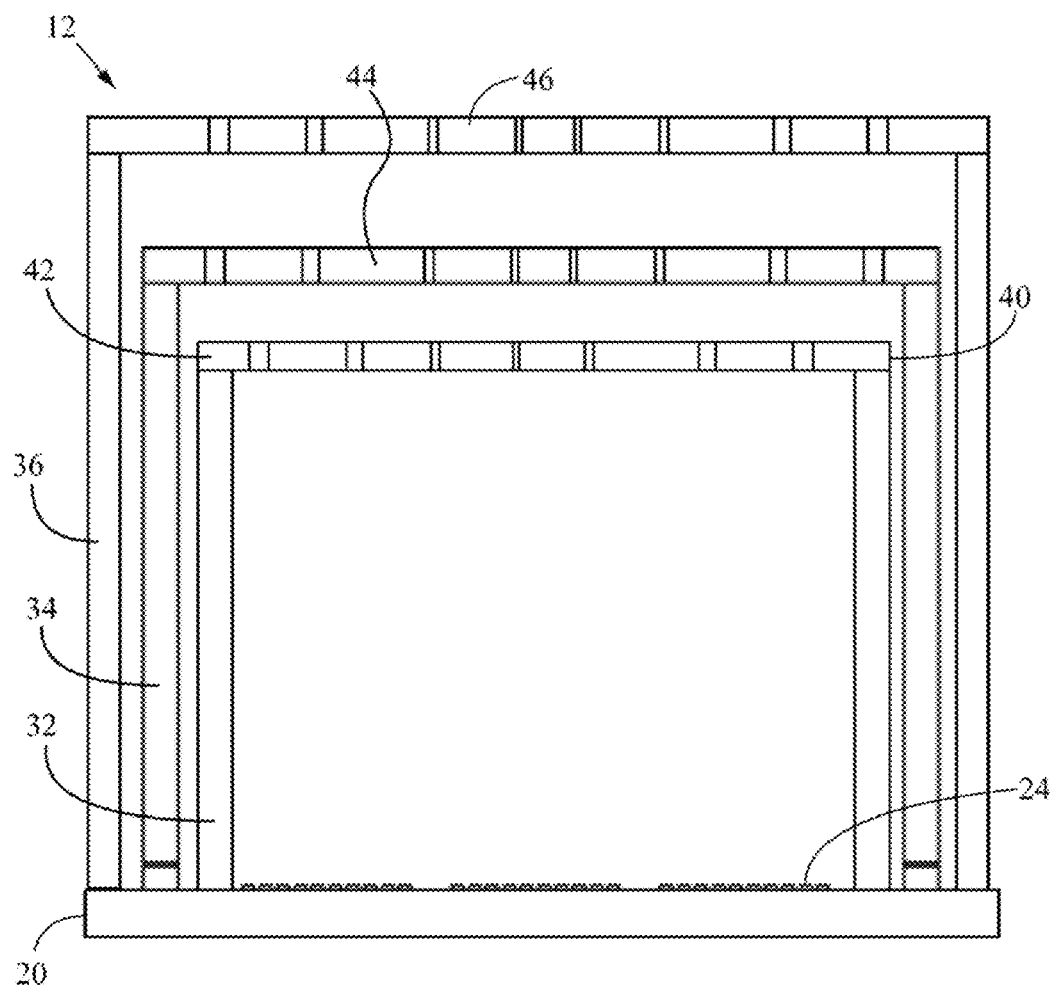
FIG. 21 is a schematic, cross-sectional view of another thermal imaging device according to some embodiments of the invention.

FIG. 21 shows a thermal imaging device 12 having multiple standoff structures 32, 34 and 36 for holding corresponding GRIN lenses 42, 44 and 46. Multiple standoff structures are useful in embodiments that utilize multiple lenses. In some embodiments, the first GRIN lens substrate 40 may effectively take the place of a separate lid wafer as part of a WLP. Accordingly, the first standoff structure 32 may be used to form the lateral "walls" of a WLP and to maintain the appropriate separation (along the optical axis) between the pixels 24 on the FPA substrate 20 and the corresponding GRIN lens 42 formed in the first lens substrate 40. The height of the first standoff structure 32 may be chosen to correspond to a focal length of the lens 42.

In some embodiments, the first standoff structure 32 is placed and bonded around the FPA substrate 20, and the first lens substrate 40 is placed and bonded to the resulting assembly at the first standoff structure 32. In other embodiments, the first standoff structure 32 may first be placed and bonded around the first lens substrate 40, and the FPA substrate 20 is subsequently placed and bonded to the resulting assembly at the first standoff structure 32. The standoffs may be placed using, for example, a pick and place process. The bonds between the FPA substrate 20 and the first standoff structure 32 and between the first standoff structure 32 and the first lens substrate 40 may be formed using, for example, a solder, brazing or fusion bonding process. The standoffs may be formed using a material such as, for example, a metal, ceramic, glass, polymer, or combinations thereof.

In order to minimize heat transfer between the micro-bolometer pixels 24 and the ambient environment through convection, a FPA may be packaged under a vacuum. Thus, the bonds between the FPA substrate 20 and first standoff structure 32, the first standoff structure 32 and first lens substrate 40, and lens 42 should be substantially hermetic. The FPA substrate 20, standoff structure 32 and lens substrate 40 may be assembled and bonded (as described above) to form hermetic seals in a vacuum environment. Alternatively, the FPA substrate 20, standoff structure 32 and lens substrate 40 may be assembled and bonded such that a fluidic "port" remains between the packaged volume and ambient environment. The package assembly is subsequently evacuated in a vacuum environment and the port hermetically sealed.

Some embodiments may further comprise a second GRIN lens 44 arranged to direct electromagnetic radiation to the first lens 42 and disposed at a prescribed distance from the first GRIN lens substrate 40 using a second standoff structure 34. The second standoff structure 34 may be substantially aligned with the first standoff structure 32 such that the second lens 44 is substantially aligned with the first lens 42. The second standoff structure 34 may be placed using, for example, a pick and place process. The bonds may be formed using, for example, a solder or fusion bonding process. The second standoff structure 34 may be formed using a material such as, for example, a metal, ceramic, glass, polymer, or combinations thereof. The volume enclosed between the first lens substrate 40 and a second lens substrate 47 may be open to the ambient environment or hermetically sealed and, in the latter case, either maintained at a vacuum or filled with a gas such as air or dry nitrogen at a pressure substantially greater than vacuum.

The above concepts are readily scalable to lens systems comprising greater than two lens substrates in the optical path by incorporating a third GRIN lens substrate 46 and a third standoff structure 36, a fourth GRIN lens substrate and a fourth series of standoffs, and so forth. In some embodiments, the standoff structures may be designed to mitigate the temperature sensitivity of the overall camera core. For example, the material of a standoff may be chosen such that the temperature coefficient of expansion of the resulting standoff offsets the temperature coefficient of index of refraction of a lens.

Figure 22:
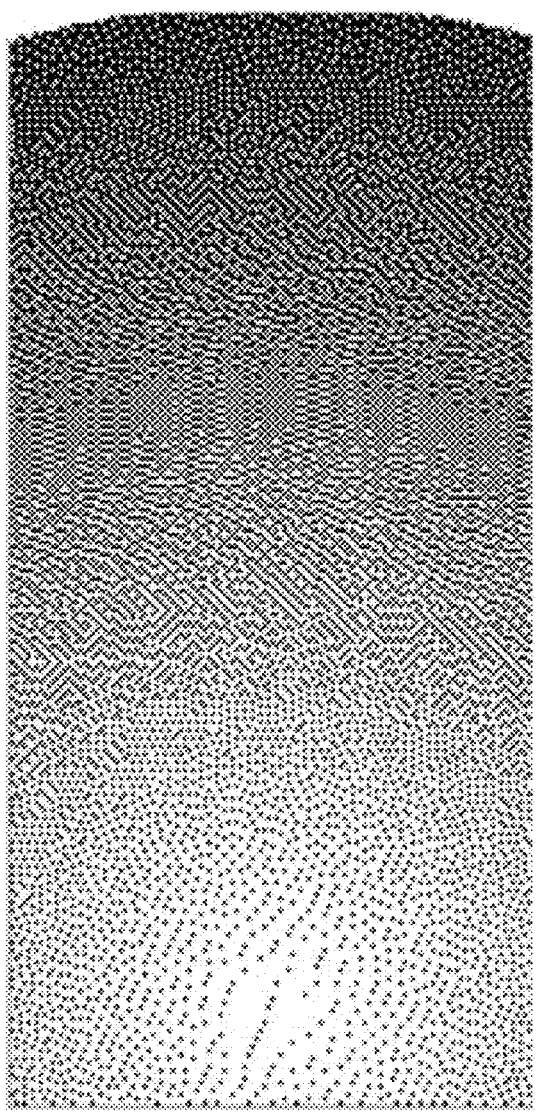
FIG. 22 shows an example of a half-tone mask pattern on a surface of a substrate, according to some embodiments of the invention.

To create the aspheric index profiles of the previous examples, several techniques may be employed. In some embodiments, the principles of halftoning are be applied to create the varying index profiles. Halftone is a reprographic technique that simulates continuous tone imagery through the use of dots, varying either in size, in shape or in spacing, thus generating a gradient like effect. "Halftone" can also be used to refer specifically to the image that is produced by this process. FIG. 22 show an example of the concept of using a "halftone" process to generate the pattern of trenches or holes in a GRIN lens. The white color represents the unetched silicon and the increasing grey color represents the reduced index of refraction created by the etched silicon. The ideal distribution of the index of refraction is transformed by the half-toning process into a series of white and black pixels, where the white pixels are locations of unetched silicon and the black pixels are locations of etched silicon. The density of the trenches or holes increases towards the edge of the lens substrate.

Several mathematical algorithms exist to produce the half-toning process including but not limited to Ordered method, Jarvis method, Stucki method, Floyd-Steinberg method, and Cardinality-Distribution method. An important consideration in the halftoning process is not to produce any ordered areas where the micro-feature sizes approach the wavelength of light to reduce unwanted diffraction and or scattering effects of the incident light. The halftoning methods of Jarvis, Stucki or Floyd-Steinberg generally produce more uniform distributions of features and minimize unwanted diffraction and or scattering effects.

The half-toning process can be further improved by shifting the locations of the etched micro-features to produce a more uniform distribution. Unlike traditional half toning processes used in printing, the location of the trenches or holes in the silicon can be finely tuned. A mathematical method can be applied to the distribution of etched trenches or holes to minimize spacing when the wavelength of the incident light is approached. The method includes an effective index calculation over an area of the etched lens. The effective index is integrated over a circle or a Gaussian distribution with a diameter equal to the wavelength of incident light. Ideally this effective index is equal to the desired effective index of the lens design. However, if the effective index of the lens differs from the ideal, the position of the etched trenches or holes can be modified to bring the effective index closer to the desired value. The method can be applied from the center moving out in concentric circles to minimize the difference between the ideal and effective index calculation. The method can be applied iteratively several times to improve the effective index calculation.

Figure 23:
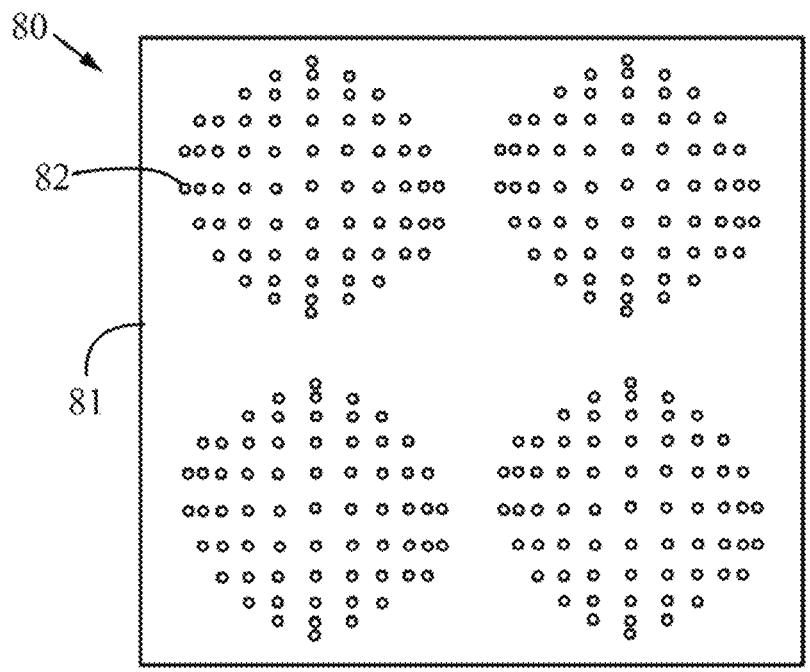
FIG. 23 is a top plan view of an array of GRIN lenses formed in a lens substrate according to some embodiments of the invention.

FIG. 23 shows an example of a 2×2 round planar GRIN lens array 80. In some embodiments, n×m element arrays or arrays of sub-arrays of planar GRIN lenses may be co-fabricated monolithically on a single-crystal silicon or silicon-on-insulator (SOI) substrate 81 using traditional MEMS batch fabrication processes such as photolithographic pattern reproduction, thin film deposition, wet etching and DRIE. In this example, the array 80 has micro-features 82 that are circular in cross-section.

Figure 24:
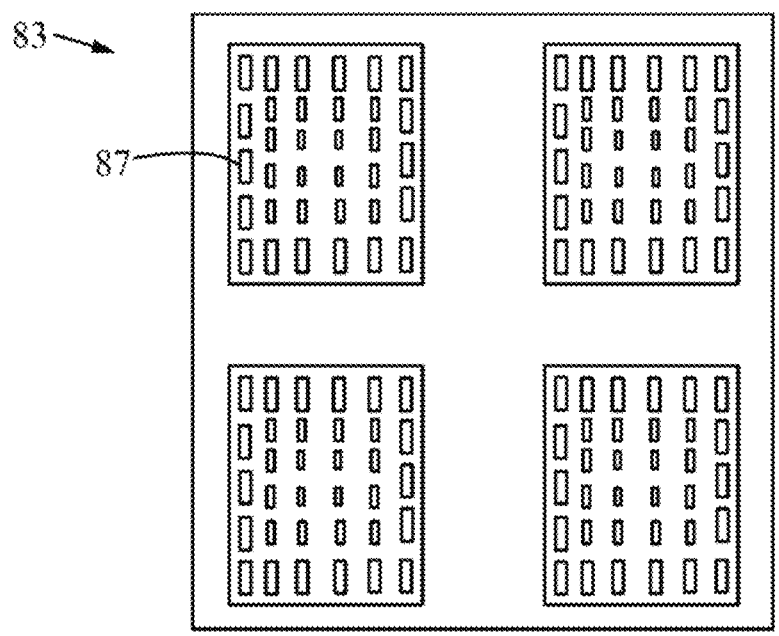
FIG. 24 is a top plan view of another array of GRIN lenses formed in a lens substrate according to some embodiments of the invention.

FIG. 24 shows an example of a 2×2 rectangular planar GRIN lens array 83 having trenches 87 that are rectangular in cross-section. Each of the trenches 87 preferably has a ratio of cross-sectional length to cross-sectional width that is greater than or equal to 3:1. In some embodiments, a DRIE process may be used to form a pattern of sub-wavelength trenches, holes, pores, posts or pillars in a silicon (Si) substrate such that the resulting element imparts a desired focusing behavior for incident electromagnetic radiation in accordance with the EMT. Each planar GRIN lens in an array may be configured to address a corresponding FPA on a FPA substrate. In some cases, a FPA may comprise an array of FPA sub-arrays. Moreover, in these embodiments, each GRIN lens may comprise an array of GRIN "lenslets" configured to address corresponding FPA sub-arrays.

In some embodiments, the planar GRIN lens array 83 comprises substantially identical planar GRIN lens unit cells. In other embodiments, an n×m element planar GRIN lens array comprises different unit cells such as, for example, lenses having different relative apertures (F/#), anti-reflection (AR) coatings, color filters, optical axis orientation, or width or diameter. The differences in optical behavior of lens elements within the planar GRIN lens array are imparted by corresponding differences in the underlying patterns of the etched micro-features. In some embodiments, the micro-features comprise pillars or posts, and in other embodiments the micro-features may comprise a combination of a plurality of trenches or holes and a plurality of pillars or posts.

Figure 25:
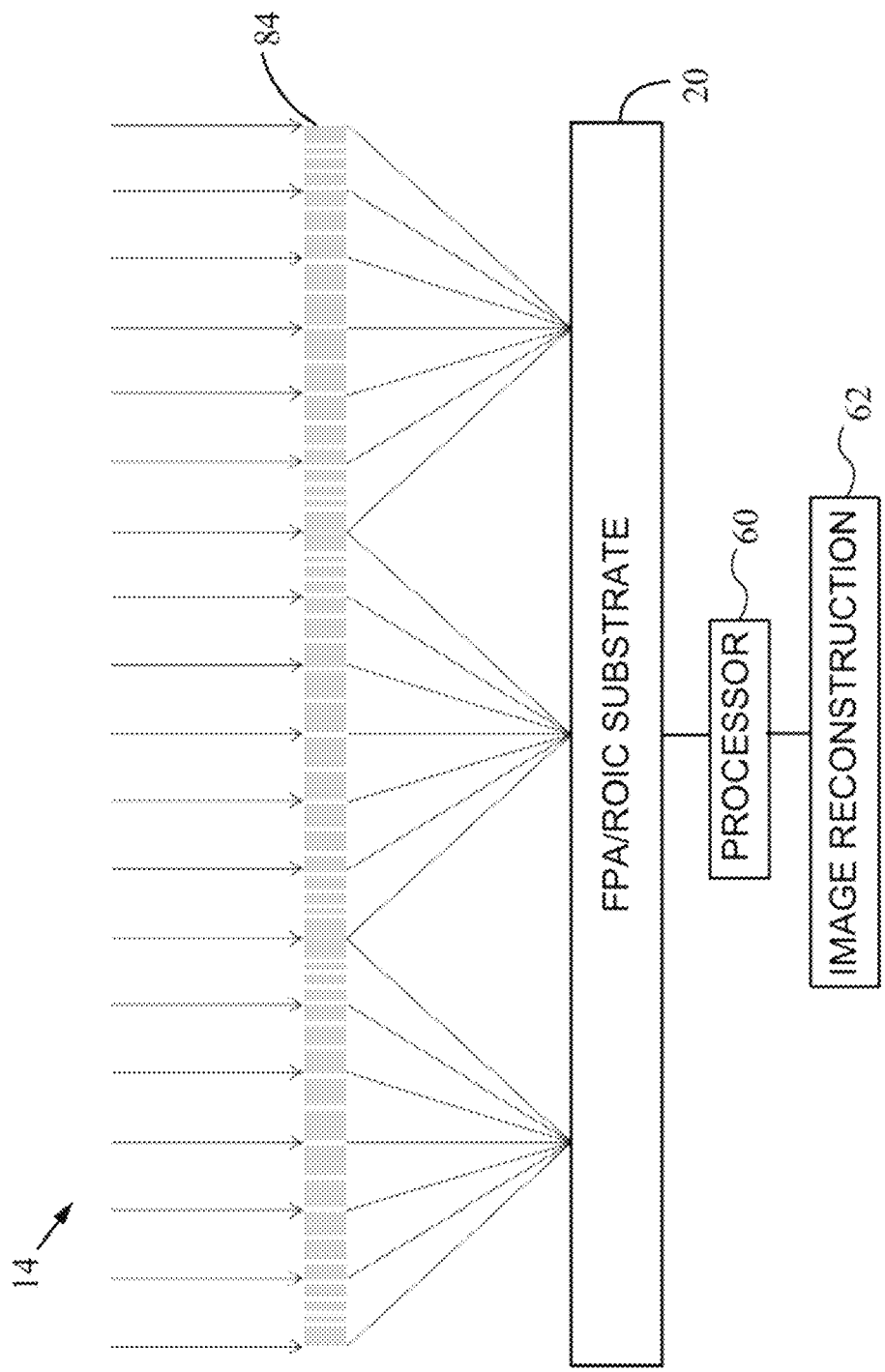
FIG. 25 shows a schematic block diagram of another thermal imaging device according to some embodiments of the invention.

FIG. 25 shows a schematic block diagram of incident electromagnetic radiation (e.g., infrared rays) being focused to three distinct focal points by corresponding elements of a 3×1 planar GRIN lens array 84. The use of a multi-aperture lens system allows variations in the way the individual aperture collects information from a scene, including independent aspheric and diffractive surface design of different lenses within the array 84, off-axis mounting, diversity in field of view, capture time, digital zoom, and even variations in focal plane. This information enables a processor 60 to perform a wide range of reconstruction analysis with an image reconstruction program 62, which in turn may provide more information about a scene than could be available from a single aperture system.

The thermal imaging device 14 can be configured to process scene data from all available pixels on the FPA/ROIC substrate 20 to achieve the highest possible resolution, or from a subset of the pixels to reduce power consumption, depending on the user's requirements. The use of multiple apertures provides an "oversampling" of the image. Therefore, even if the image from one of the pixels is defective (e.g., due to mis-calibration of the pixels during field operation, defects during manufacturing, or failures in the field), the resulting digitally reconstructed image can compensate for that based on the information from the remaining functional pixels. The processor 60 receives signals or data from the readout integrated circuit and executes an image reconstruction program 62 to construct a higher resolution image from the multiple low-resolution images from the various lenses in the array 84. Examples of suitable image reconstruction programs are those used in multi-spectral, super-resolution, and/or plenoptic imaging schemes. Computer programs may be stand-alone software entities or sub-entities (e.g., subroutines, code objects) of other computer programs.

Figure 26:
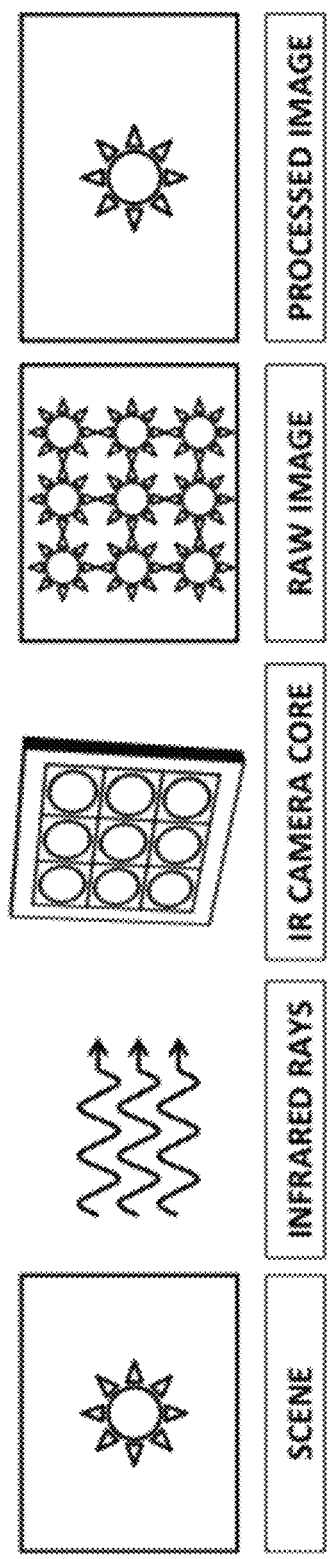
FIG. 26 is a block diagram illustrating the imaging of a scene and reconstruction of the original image according to some embodiments of the invention.

FIG. 26 is a block diagram illustrating the imaging of a scene with one or more GRIN lenses and reconstruction of the original image by digital reconstruction and/or super-resolution techniques. Each focused spot of electromagnetic radiation individually forms an image on a corresponding pixel sub-array in a focal plane array. For example, one may obtain nine independent images with a 3×3 array of pixels in a focal plane. These nine images can be processed to computationally reconstruct a higher resolution image that approaches the original image.

Figure 27:
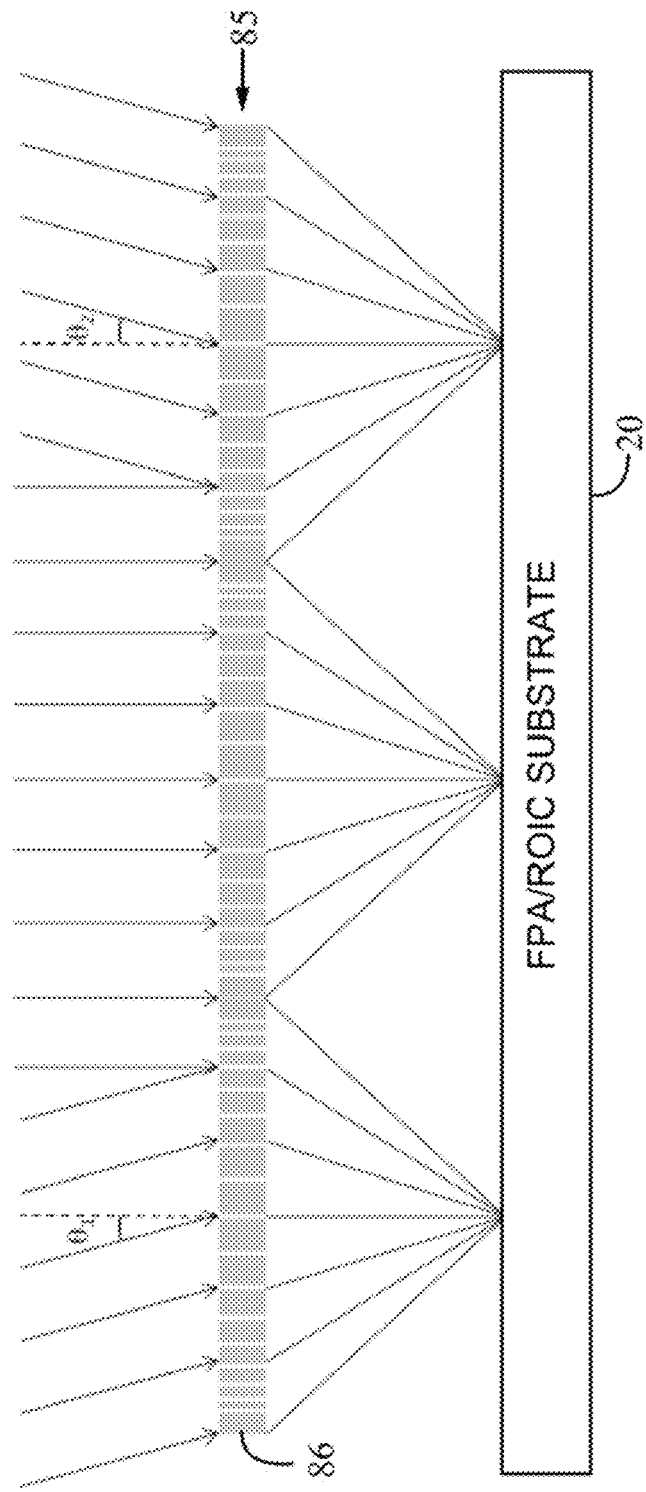
FIG. 27 shows a schematic block diagram of another thermal imaging device according to some embodiments of the invention.

FIG. 27 shows an example of a 3×1 element array 85 of planar GRIN lenses formed in the same lens substrate 86. The three lenses that are formed in the lens substrate 86 are arranged in the same plane with each other. The three lenses have different orientations of their optical axes. The first lens has an optical axis that is offset by an angle $\theta_1$ from a line normal to the lens substrate 86, the second lens has an optical axis that is normal to the lens substrate 86, and the third lens has an optical axis that is offset by an angle $\theta_2$ from a line normal to the lens substrate 86. One possible approach that may be used to tilt the optical axis of a GRIN lens is to implement a spatial bias within a pattern of sub-wavelength micro-features (e.g., trenches or holes) to induce the variation in the refractive properties of the resulting lens. A configuration in which at least two of the lenses in a lens system have different optical axes is useful in some embodiments for providing a desired field of view and/or for directing the incident electromagnetic radiation to desired focused spots on the FPA/ROIC substrate 20.

In some embodiments, a planar GRIN lens may comprise two or more stacked substrates that are attached (e.g., bonded) together. Such substrate stacking schemes may be implemented to support several objectives, such as overcoming DRIE aspect ratio limitations and providing mechanical robustness. It is understood that references to a lens substrate throughout the present disclosure may refer to either a single substrate or to a stack comprising a plurality of substrates.

Figure 28:
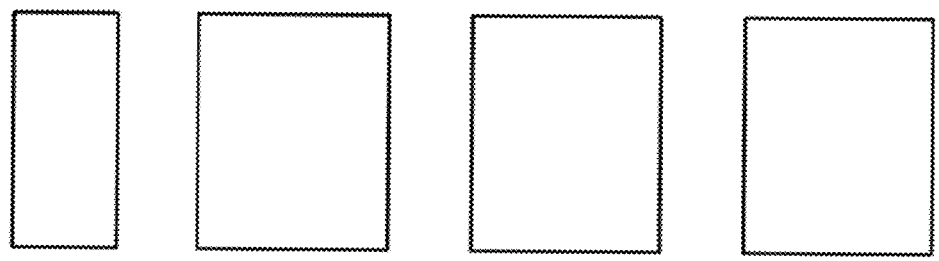
FIG. 28 is a block diagram illustrating an ideal deep reactive ion etching (DRIE) process.
Figure 29:
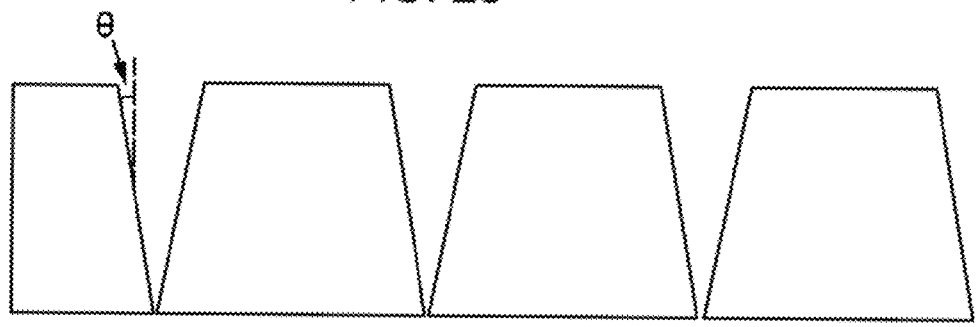
FIG. 29 is a block diagram illustrating a typical side wall angle in a DRIE process.

FIG. 28 is a block diagram showing an idealized deep reactive ion etching (DRIE) process that may produce micro-features with vertical sidewalls. However, an actual DRIE process is typically characterized by a finite sidewall angle as depicted by the sidewall angle $\theta$ in FIG. 29. In some examples, the sidewall angle $\theta$ is in the range of 80° to 100° from the plane of the substrate. In some examples, the sidewall angle is stepped (i.e., assumes more than one value over the depth of a feature). In some embodiments, it is advantageous to form planar GRIN lenses with trenches or holes having a depth in the range of 40 to 200 µm (to achieve desired focusing power) and a width or diameter in the range of 0.5 to 4 µm (to satisfy the EMT criterion). Thus, in some embodiments, the depth-to-width aspect ratio for the trenches or holes may be in the range of about 12:1 to 400:1, and preferably greater than or equal to 30:1. However, a typical silicon DRIE process may only readily support an aspect ratio in the range of 40:1 to 145:1. In some such cases, it is possible to scale the maximum effective achievable etch aspect ratio by forming a stack of separately etched substrates.

Figure 30:
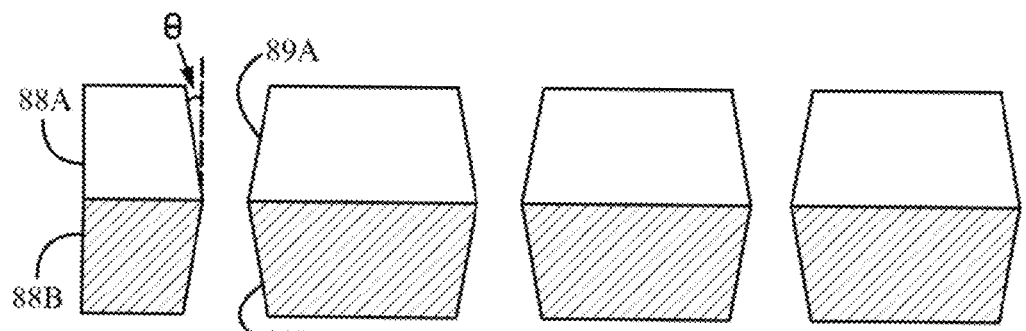
FIG. 30 is a block diagram illustrating the stacking of etched substrates to form a GRIN lens according to some embodiments of the invention.
Figure 31:
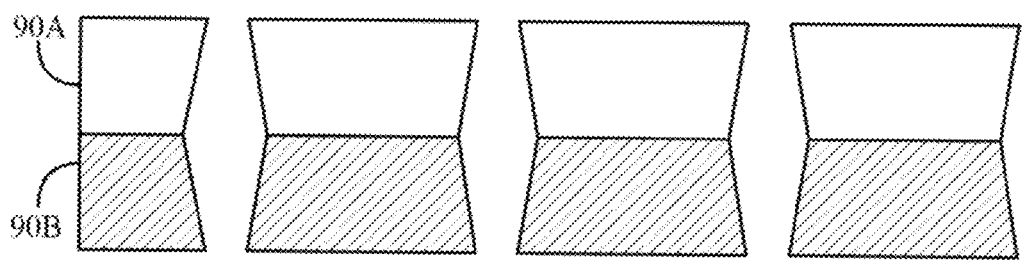
FIG. 31 is a block diagram illustrating the stacking of etched substrates to form a GRIN lens according to another embodiment of the invention.

FIG. 30 shows a keyhole-shaped profile of the micro-features, achieved by stacking two etched substrates 88A and 88B. The first substrate 88A is stacked on the second substrate 88B such that etched trenches or holes 89A in the first substrate are aligned with corresponding trenches or holes 89B in the second substrate to form combined trenches or holes. Each of the combined trenches or holes preferably has a width or diameter that is less than a wavelength of incident electromagnetic radiation, the spacing between adjacent ones of the combined trenches or holes is less than the wavelength of the electromagnetic radiation, and the size and spacing of the combined trenches or holes in the stacked substrates 88A and 88B are sufficient to produce an effective refractive index profile of the lens element that is graded (e.g., varying as a function of radial position from its center). FIG. 31 shows another embodiment of a GRIN lens having combined trenches or holes with diamond-shaped profiles achieved by stacking two etched substrates 90A and 90B.

As a specific example of stacking substrates, a DRIE process with 40:1 aspect ratio may be used to form a series of trenches or through-holes in two separate silicon (Si) substrates. Each of the substrates has a thickness of 80 µm. The trenches or holes have a width or diameter of about 2 µm. The two etched substrates are bonded (for example, using a fusion bonding process) such that the through-holes or trenches on each substrate are aligned to form combined trenches or holes. The result is stacked substrates having a combined thickness of 160 µm with holes or trenches having a width of only 2 µm, thereby doubling the effective aspect ratio enabled by the DRIE process from 40:1 to 80:1. In some embodiments, the etched Si layer is a device layer of a SOI wafer that is separated from the carrier wafer as part of the stacking process.

Figure 33:
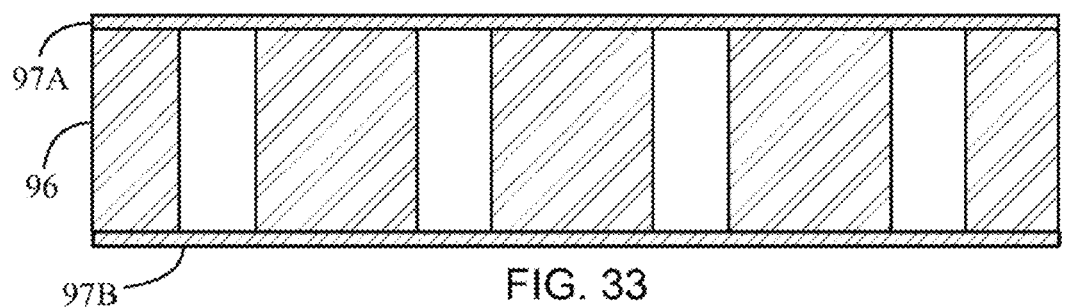
FIG. 33 is a block diagram illustrating a GRIN lens comprising a through-etched substrate with two thin lids according to some embodiments of the invention.
Figure 34:
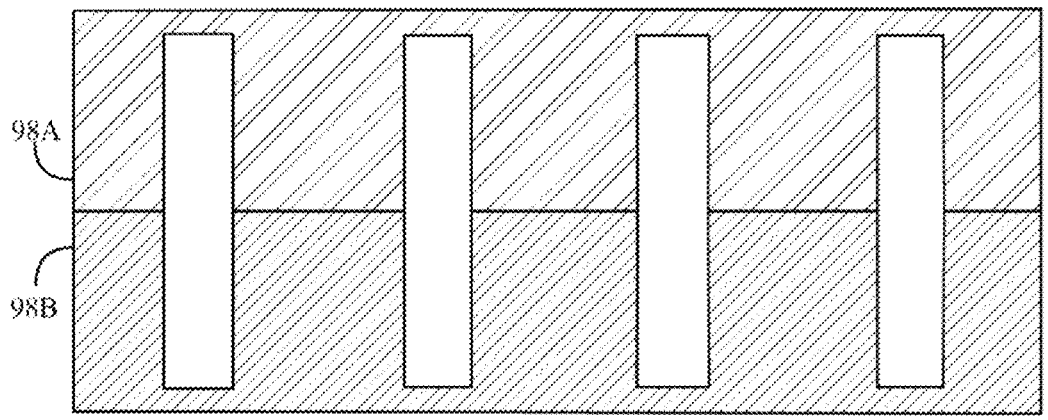
FIG. 34 is a block diagram illustrating a GRIN lens comprising two blind etched substrates bonded to form enclosed trenches or holes according to some embodiments of the invention.

The desire for mechanical robustness may provide another incentive for stacking substrates to form a GRIN lens. A boxed in cross-section increases the bending stiffness of the lens, which may be desirable to resist a pressure differential imparted by a vacuum within a FPA cavity. A second use of an enclosed substrate is to protect fine etched micro-features (such as trenches or holes having high aspect ratios) from particulate contaminants, moisture absorption and mechanical damage sustained from contact with foreign objects. In some embodiments, at least one of the substrates forming the GRIN lens (or at least one lid attached to the substrate) has a substantially flat, planar surface enclosing the micro-features an entrance side through which the electromagnetic radiation enters the lens, and the micro-features are formed in an exit side of the substrate through which the electromagnetic radiation exits. In some embodiments, the exit side may also be enclosed, preferably by a substantially flat, planar surface. A third benefit of enclosed micro-features in a lens substrate(s) is increased thermal isolation across the thickness of the substrate by reducing convection heat transfer in the etched trenches or holes. Three possible approaches for forming enclosed micro-features in substrate stacks are illustrated in FIGS. 32, 33 and 34.

Figure 32:
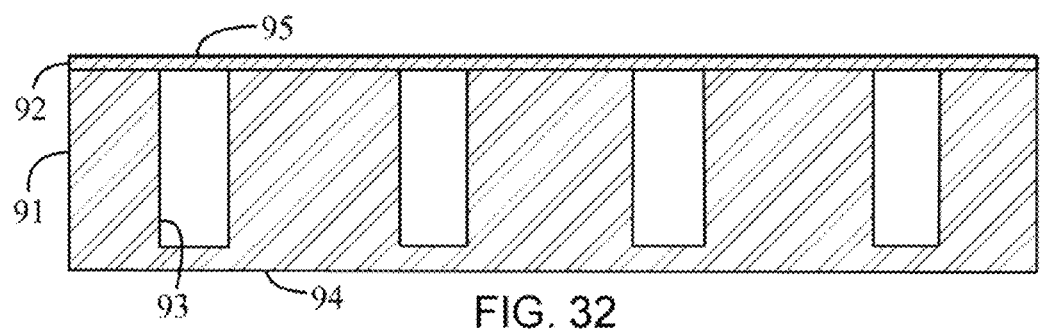
FIG. 32 is a block diagram illustrating a GRIN lens comprising a blind etched substrate with a thin lid, according to some embodiments of the invention.

In FIG. 32, a DRIE or other suitable process is used to form blind trenches or holes 93 in a silicon substrate 91, thereby leaving a first enclosed surface 94. A lid substrate 92, formed for example using the device layer of a SOI wafer, may be bonded to the DRIE process side of the substrate 91 to form a second enclosed surface 95. In FIG. 33, a DRIE or other suitable process is used to form through holes or trenches in a silicon substrate 96. A first lid substrate 97A, formed for example using the device layer of a SOI wafer, may be bonded to a first side of the substrate 96 to form a first enclosed surface. Similarly, a second lid substrate 97B, also formed for example using the device layer of a SOI wafer, may be bonded to a second side of the substrate 96 to form a second enclosed surface. In FIG. 34, DRIE or other suitable processes are used to form blind holes or trenches in first and second silicon substrates 98A and 98B, respectively, thereby leaving a first enclosed surface on each substrate. The etched sides of the first and second substrates 98A and 98B are bonded together, for example using a fusion bonding process, thereby forming fully enclosed micro-features (e.g., trenches or holes).

Figure 35:
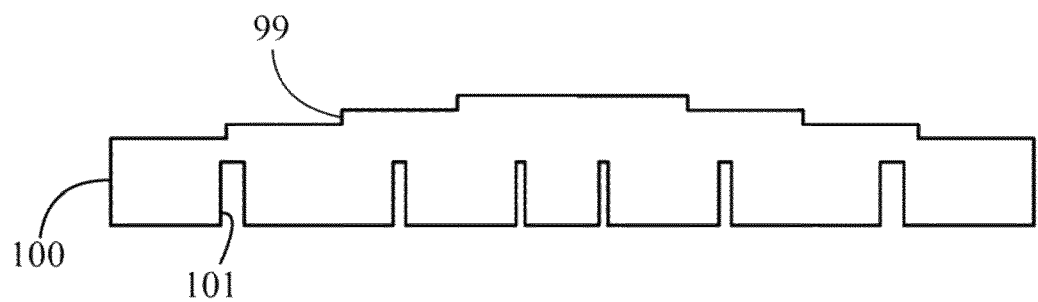
FIG. 35 shows a schematic, side view of a GRIN lens with diffractive optical elements formed in a lens substrate according to some embodiments of the invention.

FIG. 35 shows an embodiment in which diffractive elements 99 are formed on a planar GRIN lens substrate 100 as distinct structures from the etched trenches or holes 101 that are used to impart the refractive behavior of the lens. The diffractive elements 99 may be formed using a thin film or etched into the bulk substrate 100. Furthermore, the diffractive elements 99 may be formed on either or both surfaces of the lens substrate 100. In other embodiments, diffractive elements may be implemented in several different ways. For example, in some embodiments, diffractive elements are incorporated and arranged with the etched micro-features that are used to impart the refractive behavior of the lens on a planar GRIN lens substrate. The diffractive elements may be formed in the lens substrate using, for example, a separate etch process. Diffractive optical elements are optional features to compensate for dispersion and optical aberrations within a planar GRIN lens.

Figure 36:
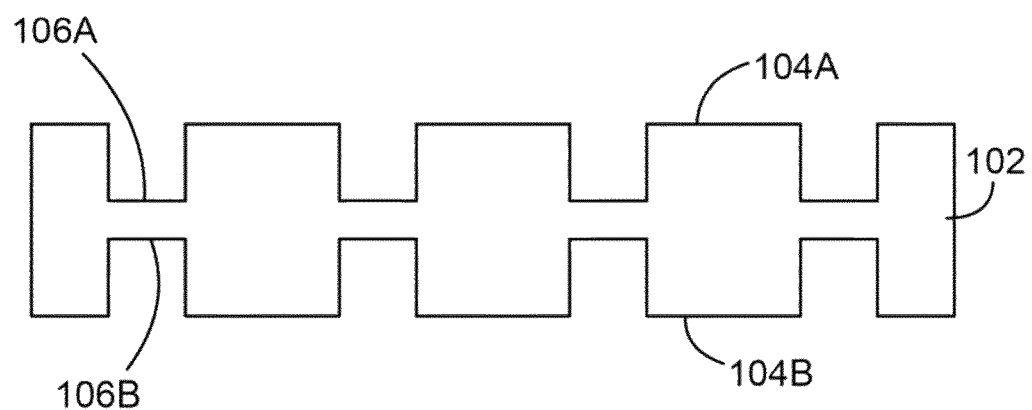
FIG. 36 shows a schematic, side view of a GRIN lens with micro-features formed in two sides of a substrate according to another embodiment of the invention.

FIG. 36 shows another embodiment of a gradient-index lens for focusing incident electromagnetic radiation. The lens comprises at least one substrate 102 having first and second opposing sides 104A, 104B (top and bottom sides in the drawing, although the relative orientation may vary during use). The first side 104A has a first set of trenches or holes 106A formed therein (e.g., blind holes or blind trenches that do not extend all the way through the substrate), and the second side 104B has a second set of trenches or holes 106B formed therein (e.g., blind holes or blind trenches that also do not extend all the way through the substrate). The size and spacing of the trenches or holes 106A, 106B formed in both of the sides of the substrate 102 are sufficient to produce an effective refractive index profile of the lens that is graded. In some embodiments, the refractive index profile is aspheric. Forming micro-features 106A, 106B in both sides of the substrate 102 is useful in embodiments where it is desired to remove more material from the substrate (e.g., by etching) to achieve a desired index of refraction.

Figure 37A:
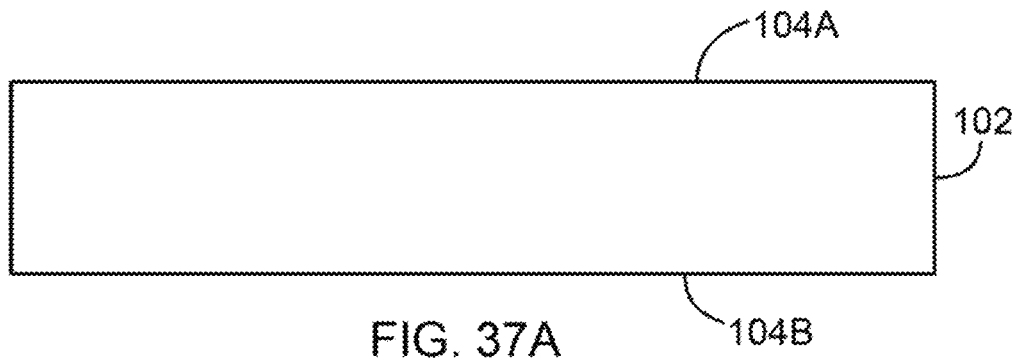
FIGS. 37A-F are schematic block diagrams illustrating fabrication steps for producing a lens with micro-features formed in two sides of a substrate, according to some embodiments of the invention.
Figure 37B:
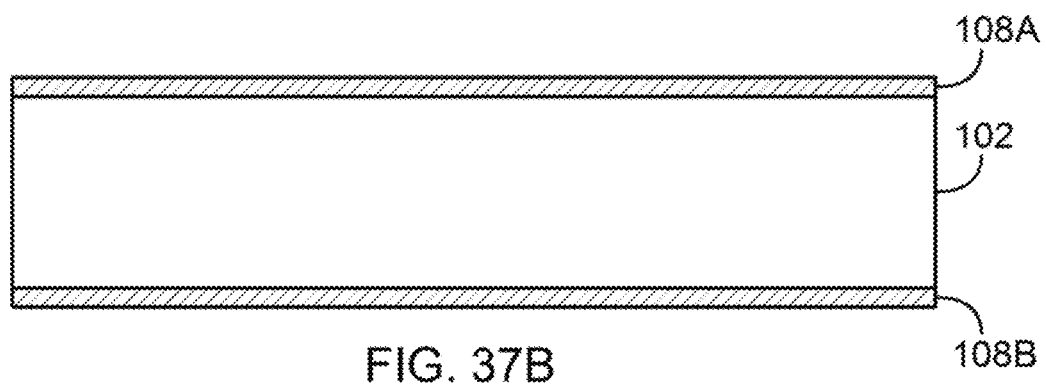
Figure 37C:
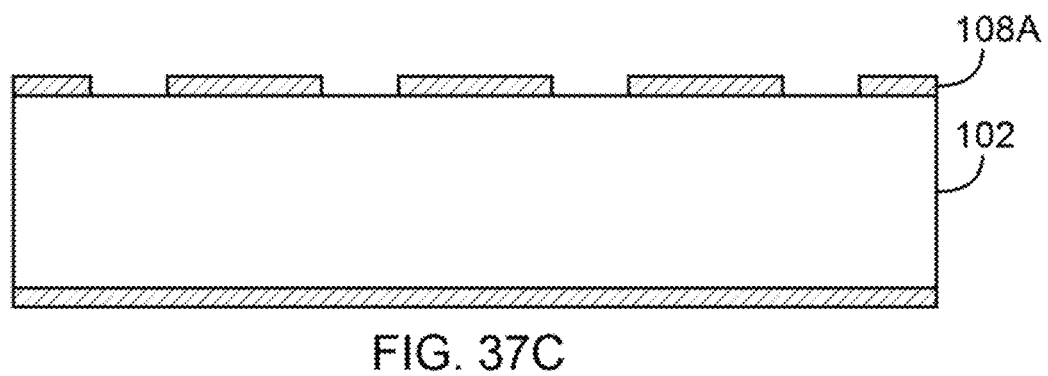
Figure 37D:
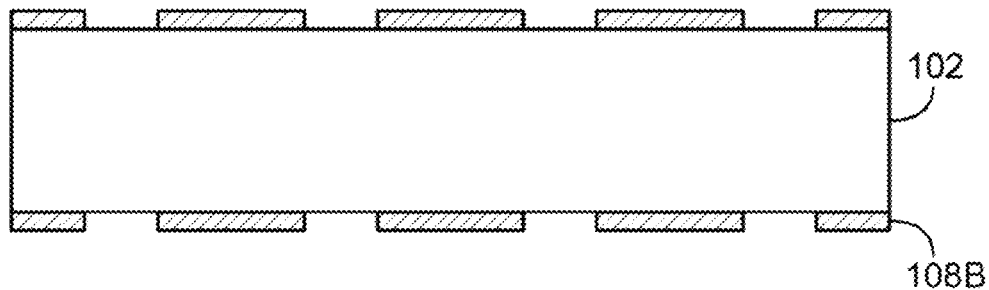

FIGS. 37A-F are schematic diagrams illustrating fabrication steps for producing the lens of FIG. 36, according to some embodiments of the invention. In FIG. 37A, the substrate 102 (e.g., a single-crystal silicon substrate) is ground to a desired thickness (e.g., 100 to 400 μm) and polished on first and second sides 104A, 104B. In FIG. 37B, oxide hardmasks 108A, 108B (e.g., layers of silicon dioxide, each having a thickness in the range of 0.25 to 2 μm) are deposited on the first and second sides of the substrate 102. The hardmasks 108A, 108B may be deposited on both sides of the substrate 102 simultaneously if performed by low-pressure chemical vapor deposition (LPCVD), or one side of the substrate 102 at a time if performing plasma-enhanced chemical vapor deposition (PECVD) or physical vapor deposition (PVD). In FIG. 37C, the hardmask 108A is patterned by lithography and etching to a corresponding pattern for the trenches or holes to be etched in the first side of the substrate 102. In FIG. 37D, the hardmask 108B is patterned by lithography and etching to a corresponding pattern for the trenches or holes to be etched in the second side of the substrate 102.

Figure 37E:
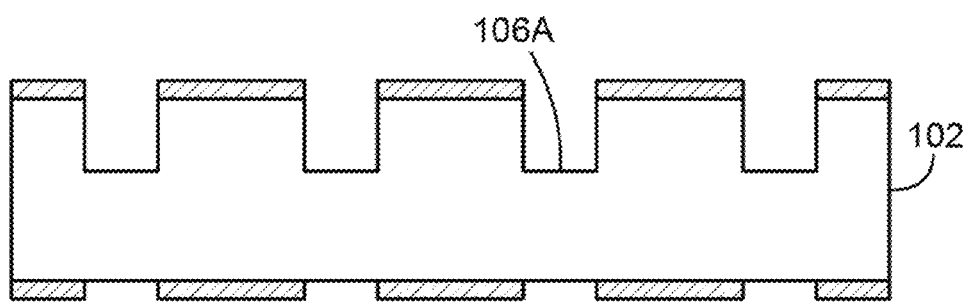
Figure 37F:
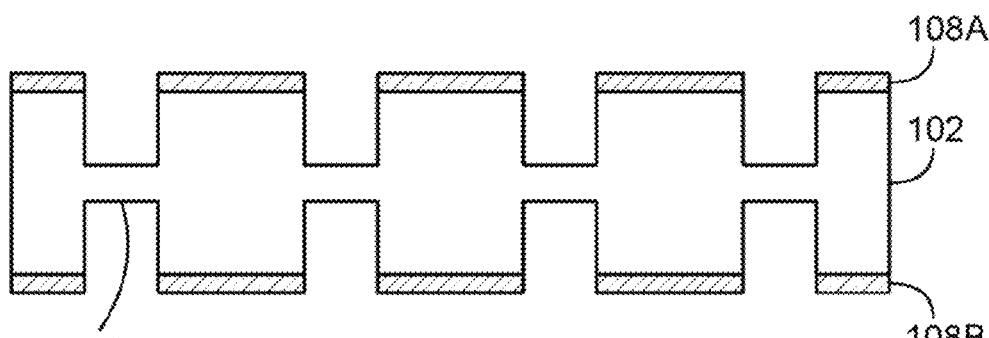

In FIG. 37E, the micro-features 106A (e.g., trenches or holes) are formed in the top side of the substrate 102 preferably by deep reactive ion etching. The trenches or holes preferably have a depth in the range of 20 to 100 μm and a width or diameter in the range of 0.5 to 4 μm. In FIG. 37F, the micro-features 106B (e.g., trenches or holes) are formed in the second side of the substrate 102 by deep reactive ion etching (e.g., to a depth in the range of 20 to 100 μm). The hardmasks 108A, 108B are removed (e.g., using HF vapor) to result in the structure of the substrate 102 shown in FIG. 36. Many other fabrication techniques are possible in alternative embodiments. For example, in some embodiments it is helpful to use one or more handle wafers if the substrate 102 is too thin after grinding and/or delicate after the first DRIE step. A handle or carrier wafer may be bonded to the substrate 102 to provide support or ease of handling, and then later removed.

Figure 38:
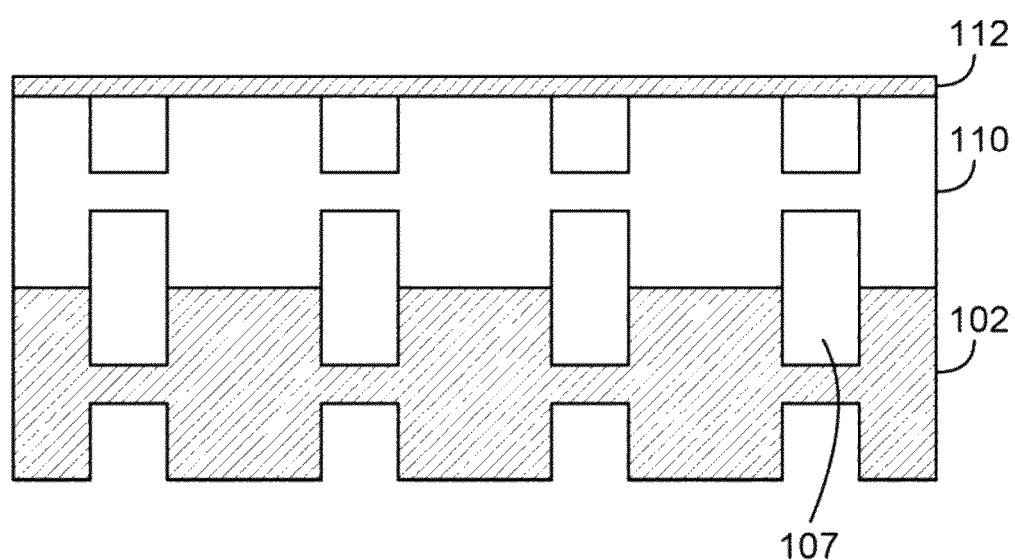
FIG. 38 is a schematic side view of another GRIN lens comprising two substrates attached to form enclosed trenches or holes, according to some embodiments of the invention.

FIG. 38 is a schematic side view of another GRIN lens, according to some embodiments of the invention. The lens includes the substrate 102 (described above with micro-features formed in both sides) and a second substrate 110 having at least one side with another set of trenches or holes formed therein. The substrates 102, 110 are attached to each other (e.g., bonded) such that the trenches or holes in the substrate 110 are substantially aligned with trenches or holes in the substrate 102 to form combined trenches or holes 107 that are fully enclosed. The substrate 110 optionally includes micro-features etched into its first and second sides, similar to the substrate 102. In this case, an optically transmissive lid 112 (e.g., a substrate) is useful. One side of the stack of substrates 102, 110, that may be exposed to the surrounding environment during use of the lens, is capped with a silicon lid 112 to keep out contaminants and protect the micro-features. Alternatively, both sides of the stack of substrates 102, 110 may be capped with lids. In some embodiments, the second substrate 110 may only have blind holes or trenches etched in one side that is attached to the first substrate 102, in which case a lid may not be necessary. Diffractive elements may be etched in the second substrate 110, similar to the diffractive elements shown in FIG. 30.

The description above illustrates embodiments of the invention by way of example and not necessarily by way of limitation. Many other embodiments and variations are possible. For example, the GRIN lenses may be incorporated into a camera having an optically transmissive lid (e.g., formed using germanium or silicon) that is provided as part of the overall vacuum package and that serves as a window for incident IR radiation. The infrared (IR) camera typically includes a camera core comprising a Focal Plane Array (FPA), a lens system and an enclosure. The FPA typically comprises multiple elements—the underlying Read-Out Integrated Circuit (ROIC), the thermistor or micro-bolometer pixel array which is built on top of the ROIC, usually on the same silicon wafer and integrated with the ROIC, and a "packaged window" or lid (e.g., formed using germanium or silicon) which is substantially transparent to incoming IR radiation and which is bonded on top of the FPA with a hermetic vacuum seal. A single GRIN lens or a system of GRIN lenses is mounted on top of the FPA (e.g., one or more GRIN lenses may be screwed on or molded to a housing).

In some embodiments, one or more GRIN lenses formed in at least one substrate may form the vacuum package with the FPA, eliminating the need for a separate "packaged window" or lid. In some embodiments, refractive optical elements may be provided, such as an etched refractive surface formed in one or more lens substrates. Imaging devices (e.g., camera cores) may include just one lens substrate and one pixel, or the imaging devices may comprise multiple lenses, lens substrates and/or pixel arrays. The imaging devices may be used in a wide range of applications such as expanded security, surveillance, first responder, and automotive applications.

The planar GRIN lens substrate may further comprise a series of lens carriers, wherein each lens carrier comprises a "shelf" or "ledge" structure to align and support a corresponding discrete lens, and a through "window" to pass incident electromagnetic radiation. A discrete lens may be positioned onto a corresponding lens carrier using, for example, a pick and place process. In some configurations, a discrete lens is attached to the lens carrier using a hermetic bond formed using, for example, a fusion bonding, brazing, or solder process. Multi-spectral imaging schemes may thus be implemented by pairing individual lenses on a lens substrate to corresponding detectors on a FPA substrate. As an example, a lens substrate may be formed having a monolithic planar GRIN lens disposed over a micro-bolometer-based FPA to support infrared imaging and a discrete lenticular glass lens assembled in a lens carrier disposed over a CMOS-based FPA to support visible light imaging. This modular approach to multi-spectral imaging may be readily extended to additional bands of electromagnetic radiation including, for example, near-infrared (NIR) and ultraviolet (UV), using suitable pairs of lenses and detectors.

Accordingly, the scope of the invention should be determined by the following claims and their legal equivalents.

What is claimed is:

1. A gradient-index lens for directing incident electromagnetic radiation, the lens comprising at least first and second substrates, wherein each of the substrates has a plurality of trenches or holes formed therein, the first substrate is stacked on the second substrate such that the trenches or holes in the first substrate are substantially aligned with corresponding trenches or holes in the second substrate to form combined trenches or holes, and an effective refractive index profile of the lens is graded.

2. The lens of claim 1, wherein at least some of the combined trenches or holes comprise substantially L-shaped trenches.

3. The lens of claim 1, wherein at least some of the combined trenches or holes comprise trenches that are arranged in a pattern of spokes or crosses.

4. The lens of claim 1, wherein the trenches or holes formed in at least one of the substrates are blind, thereby leaving at least one surface enclosing the combined trenches or holes on at least one side of the lens.

5. The lens of claim 1, wherein each of the combined trenches or holes has a depth in the range of 40 to 200 μm and a width or diameter in the range of 0.5 to 4 μm.

6. The lens of claim 1, wherein each of the combined trenches or holes has an aspect ratio of depth to width greater than or equal to 80:1.

7. The lens of claim 1, further comprising diffractive elements formed in at least one of the substrates.

8. A camera comprising at least one pixel in a focal plane, wherein the lens of claim 1 is arranged to direct the electromagnetic radiation to the pixel.

9. The camera of claim 8, further comprising at least one readout circuit electrically connected to the pixel, and further comprising at least one processor in communication with the circuit, wherein the processor is programmed to construct an image from pixel signals.

10. A method for fabricating a gradient-index lens for directing incident electromagnetic radiation, the method comprising:
    a) forming a plurality of trenches or holes in at least first and second substrates; and
    b) attaching the first substrate to the second substrate such that the trenches or holes in the first substrate are substantially aligned with corresponding trenches or holes in the second substrate to form combined trenches or holes, wherein an effective refractive index profile of the lens is graded.

11. The method of claim 10, wherein each of the combined trenches or holes has a depth in the range of 40 to 200 μm and a width or diameter in the range of 0.5 to 4 μm.

12. The method of claim 10, wherein each of the combined trenches or holes has an aspect ratio of depth to width greater than or equal to 80:1.

13. The method of claim 10, further comprising the step of forming diffractive elements in at least one of the substrates.

14. The method of claim 10, wherein the step of forming a plurality of trenches or holes in the substrates comprises producing at least one mask made by halftone design on at least one surface of the substrates and etching the substrates.

15. A gradient-index lens for directing incident electromagnetic radiation, the lens comprising at least one substrate having first and second opposing sides, wherein the first side has a first set of blind holes or trenches formed therein, the second side has a second set of blind holes or trenches formed therein, and an effective refractive index profile of the lens is graded.

16. The lens of claim 15, wherein at least some of the trenches or holes comprise substantially L-shaped trenches.

17. The lens of claim 15, wherein at least some of the trenches or holes comprise trenches that are arranged in a pattern of spokes or crosses.

18. The lens of claim 15, wherein at least some of the trenches or holes comprise curved trenches, each of the curved trenches has a cross-sectional area in a plane substantially perpendicular to a line defining the depth of the trench, and the cross-sectional area is substantially shaped like an arc, spiral, or ring.

19. The lens of claim 15, wherein each of the trenches or holes has a depth in the range of 20 to 100 μm and a width or diameter in the range of 0.5 to 4 μm.

20. The lens of claim 15, wherein each of the trenches or holes has an aspect ratio of depth to width that is greater than or equal to 30:1.

21. A camera comprising at least one pixel in a focal plane, wherein the lens of claim 15 is arranged to direct the electromagnetic radiation to the pixel.

22. The camera of claim 21, further comprising at least one readout circuit electrically connected to the pixel, and further comprising at least one processor in communication with the readout circuit, wherein the processor is programmed to construct an image from pixel signals.

23. The lens of claim 15, further comprising a second substrate having at least one side with a third set of trenches or holes formed therein, wherein the substrates are attached to each other such that the trenches or holes in the third set are substantially aligned with the trenches or holes in either the first or the second set to form combined trenches or holes.

* * * * *